(12) United States Patent
Wang et al.

(10) Patent No.: US 11,374,754 B2
(45) Date of Patent: Jun. 28, 2022

(54) SYSTEM AND METHOD FOR GENERATING TRUST TOKENS

(71) Applicant: Visa International Service Association, San Francisco, CA (US)

(72) Inventors: Quan Wang, Foster City, CA (US); Weiyi Zhou, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 101 days.

(21) Appl. No.: 16/641,616

(22) PCT Filed: Sep. 7, 2017

(86) PCT No.: PCT/US2017/050519
§ 371 (c)(1),
(2) Date: Feb. 24, 2020

(87) PCT Pub. No.: WO2019/050527
PCT Pub. Date: Mar. 14, 2019

(65) Prior Publication Data
US 2021/0167962 A1 Jun. 3, 2021

(51) Int. Cl.
*H04L 9/32* (2006.01)
*H04L 9/00* (2022.01)
(Continued)

(52) U.S. Cl.
CPC ............ *H04L 9/3213* (2013.01); *H04L 9/006* (2013.01); *H04L 9/0827* (2013.01);
(Continued)

(58) Field of Classification Search
CPC ..... H04L 9/3213; H04L 9/006; H04L 9/0827; H04L 9/3247; H04L 2209/38;
(Continued)

(56) References Cited

U.S. PATENT DOCUMENTS 10,521,780 B1 * 12/2019 Hopkins, III .......... G06Q 20/12
10,601,585 B1 * 3/2020 Robinson ............... H04L 9/085
(Continued)

FOREIGN PATENT DOCUMENTS

KR          101661933          10/2016

OTHER PUBLICATIONS

PCT/US2017/050519, "International Search Report and Written Opinion", dated Jun. 7, 2018, 10 pages.

*Primary Examiner* — Abu S Sholeman
(74) *Attorney, Agent, or Firm* — Kilpatrick Townsend & Stockton LLP

(57) ABSTRACT

A trust token may be created including authentication data for a user and his or her associated communication device. The trust token may be transmitted by the communication device to one or more recipients, such as a token server. The recipients may interpret the trust token and verify it against data written to one or more nodes of a blockchain when the user and the communication device registered for the trust token. Once the trust token is verified, the token server may be configured to generate, maintain, and provision account tokens representing sensitive data. The token server may push one or multiple account tokens to the communication device, thereby allowing the communication device to perform transactions with the account tokens. In other words, the implementation of a trust token may allow the communication device to be provisioned with multiple account tokens, without requiring multiple logins or transmissions of sensitive data.

20 Claims, 11 Drawing Sheets

(51) Int. Cl.
*H04L 9/08* (2006.01)
*G06Q 20/20* (2012.01)
*G06Q 20/22* (2012.01)
*G06Q 20/32* (2012.01)
*G06Q 20/38* (2012.01)

(52) U.S. Cl.
CPC ......... *H04L 9/3247* (2013.01); *G06Q 20/204* (2013.01); *G06Q 20/227* (2013.01); *G06Q 20/327* (2013.01); *G06Q 20/389* (2013.01); *G06Q 20/3825* (2013.01); *G06Q 20/3829* (2013.01); *H04L 2209/38* (2013.01)

(58) Field of Classification Search
CPC .. G06Q 20/204; G06Q 20/227; G06Q 20/327; G06Q 20/3825; G06Q 20/3829; G06Q 20/389; G06Q 20/3821
See application file for complete search history.

(56) References Cited

U.S. PATENT DOCUMENTS

| | | | |
|---|---|---|---|
| 2006/0085633 A1* | 4/2006 | Balfanz | G06Q 20/02 713/155 |
| 2016/0294562 A1* | 10/2016 | Oberheide | H04L 9/0863 |
| 2016/0328713 A1* | 11/2016 | Ebrahimi | G06K 19/06028 |
| 2016/0342989 A1 | 11/2016 | Davis | |
| 2017/0180134 A1* | 6/2017 | King | H04L 63/0853 |
| 2017/0237554 A1 | 8/2017 | Jacobs et al. | |
| 2018/0337951 A1* | 11/2018 | Agarwal | H04L 9/088 |
| 2019/0312877 A1* | 10/2019 | Zhang | H04L 63/102 |

\* cited by examiner

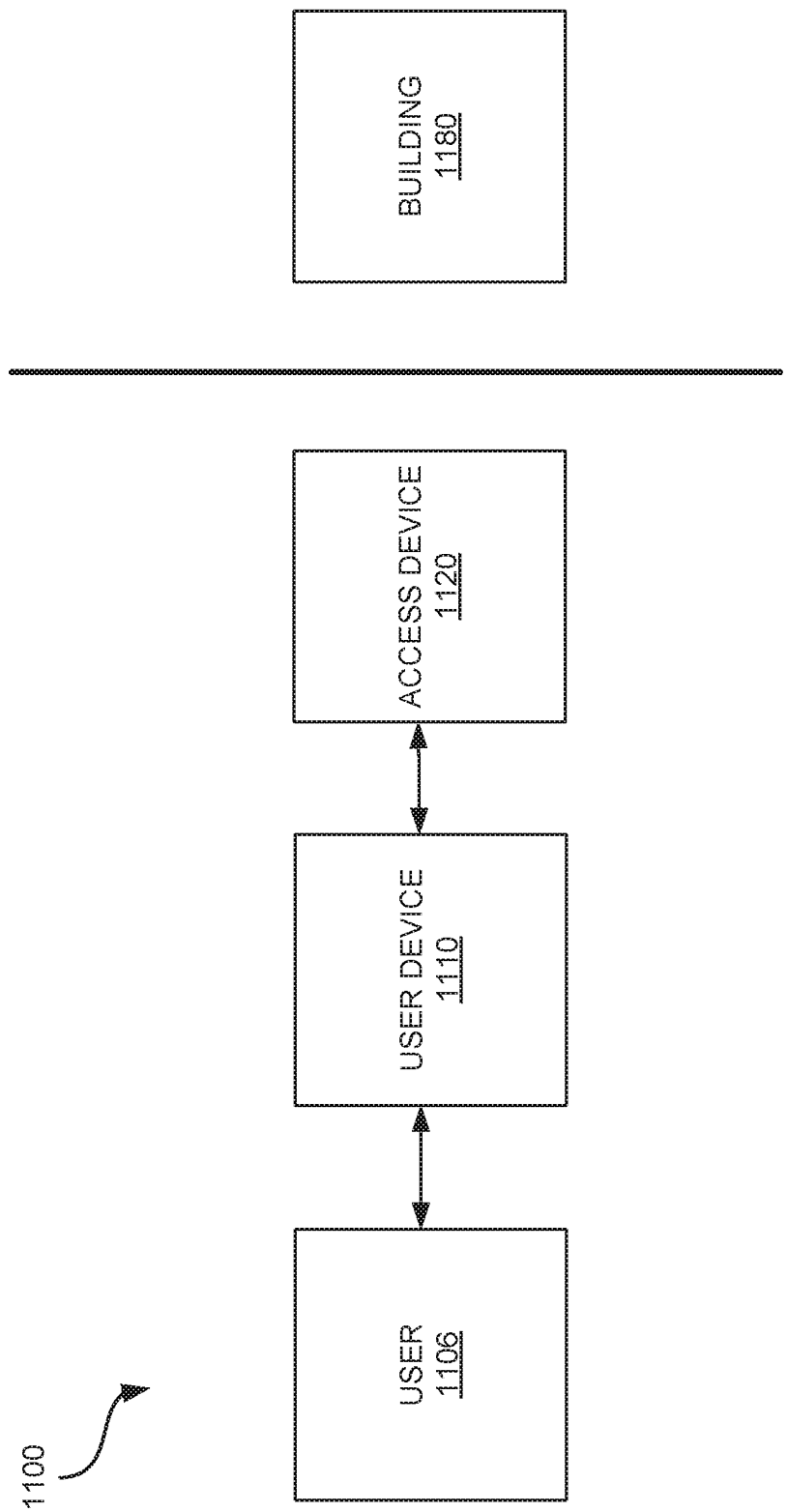

SYSTEM AND METHOD FOR GENERATING TRUST TOKENS

CROSS-REFERENCES TO RELATED APPLICATIONS

This application is the US national stage of PCT/US2017/050519, filed Sep. 7, 2017, the disclosure of which is incorporated herein by reference in its entirety.

BACKGROUND

Users may implement an ever increasing number of functions on their communication devices. A communication device may now be used instead of other form factors to take actions. For example, a communication device may be provisioned with an account token to allow the user to securely perform transactions using the communication device, such as to make a purchase or to gain access to a secured area. The account token may represent sensitive data, and may be secure in that it hides and protects the sensitive data, such a credential, an account number, or an access code, that is needed to perform the transaction.

Because the account token may represent sensitive data and may allow a user to perform sensitive transactions, authentication may be required in order to provision the account token on the communication device. For example, device authentication may be performed to ensure that the communication device is a legitimate communication device capable of storing a provisioned account token. In another example, user authentication may be performed to ensure that the user of the communication device is an authorized user of the communication device and has permission to use the account token.

User authentication may require a user to, for example, enter a registered user name and password associated with a user account for each account token to be provisioned. Once the user name and password have been confirmed, the account token associated with that particular user account may be provisioned onto the communication device. In other words, for each account token desired to be provisioned on the communication device, a separate login process may be required. Thus, if multiple account tokens are needed on the communication device, multiple login processes may need to be performed. This may be time consuming and inefficient, and require the user to remember and correctly provide a potentially large amount of account data.

Embodiments of the invention address this and other problems, individually and collectively.

SUMMARY

According to some embodiments of the invention, a method is provided. The method comprises receiving, by a server computer, a signed key including a first public key signed by a first private key, wherein the first public key and the first private key are associated with a communication device of a user. The method further comprises transmitting, by the server computer, the first public key to one or more nodes on a blockchain. The one or more nodes generates a second public key and a second private key associated with the user of the communication device, digitally signs the first public key with the second private key to generate a digital signature, and records the digital signature on the one or more nodes of the blockchain. The method further comprises receiving, by the server computer, the digital signature from the one or more nodes of the blockchain. The method further comprises generating, by the server computer, a trust token using the digital signature. The method further comprises transmitting, by the server computer, the trust token to the communication device.

According to some embodiments of the invention, a method is provided. The method comprises receiving, by one or more nodes of a blockchain, a first public key from a first server computer. The public key is associated with a communication device of a user. The method further comprises generating, by the one or more nodes of the blockchain, a second public key and a second private key associated with the user of the communication device. The method further comprises signing, by the one or more nodes of the blockchain, the first public key with the second private key to generate a digital signature. The method further comprises recording, by the one or more nodes of the blockchain, the digital signature on the blockchain on the one or more nodes. The method further comprises transmitting, by the one or more nodes of the blockchain, the digital signature to the first server computer. The method further comprises receiving, by the one or more nodes, the digital signature from a second server computer in a request for a transaction. The method further comprises verifying, by the one or more nodes, the digital signature from the second server computer against the digital signature recorded at the one or more nodes. The method further comprises transmitting, by the one or more nodes, a verification of the digital signature to the second server computer, wherein the second server computer thereafter processes the request for the transaction.

According to some embodiments of the invention, a method is provided. The method comprises receiving input, on a communication device, corresponding to account data related to a user of the communication device. The method further comprises generating, by the communication device, a first public key and a first private key associated with the communication device. The method further comprises generating, by the communication device, a signed key including the first public key signed by the first private key. The method further comprises transmitting, by the communication device, the signed key to a first server computer, wherein the first server computer transmits the first public key to one or more nodes on a blockchain. The one or more nodes generate a second public key and a second private key associated with the user, digitally sign the first public key with the second private key to generate a digital signature, and record the digital signature to the one or more nodes on a blockchain. The method further comprises receiving, by the communication device, the digital signature. The method further comprises transmitting, by the communication device, the digital signature to a second server computer in a request for a transaction, wherein the second server computer thereafter receives a verification from the one or more nodes that the digital signature received from the communication device has been verified against the blockchain. The method further comprises processing, by the second server computer, the request for the transaction.

Embodiments of the invention are further directed to a server computer comprising a processor and a memory coupled to the processor. The memory can store instructions, executable by the processor, for implementing the methods described herein.

These and other embodiments of the invention are described in further detail below.

BRIEF DESCRIPTION OF THE DRAWINGS

FIG. 11 shows a block diagram of a building access system that can use a user device provisioned with an account token according to some embodiments of the present invention.

DETAILED DESCRIPTION

Figure 1:
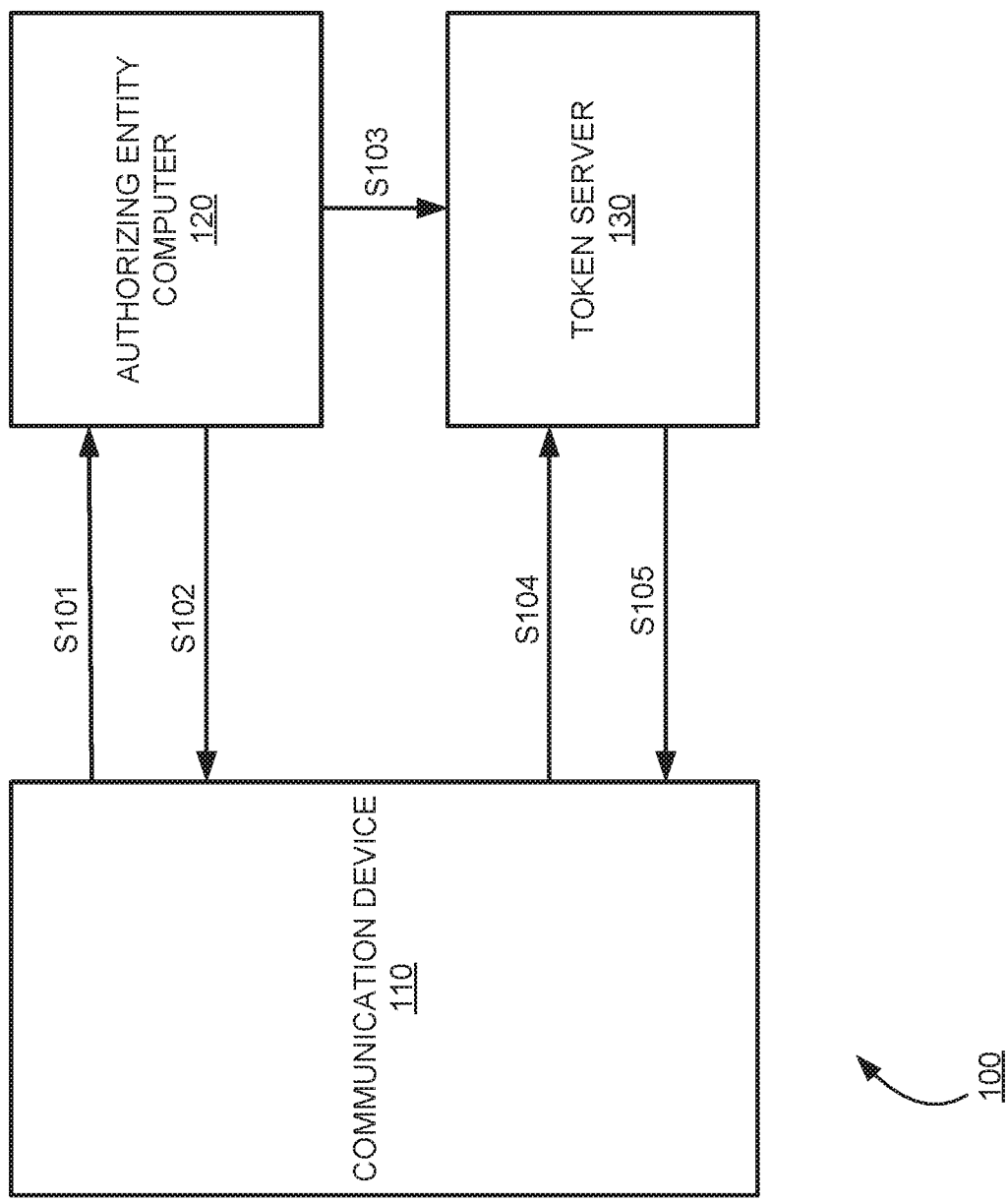
FIG. 1 shows a block diagram of an account token provisioning system and method according to some embodiments of the present invention.

According to some embodiments of the invention, a trust token may be created including authentication data for a user and his or her associated communication device. The trust token may be transmitted by the communication device to one or more recipients, such as a token server. The recipients may interpret the trust token and verify it against data written to one or more nodes of a blockchain when the user and the communication device registered for the trust token. Once the trust token is verified, the token server may be configured to generate, maintain, and provision account tokens representing sensitive data. The token server may push one or multiple account tokens to the communication device, thereby allowing the communication device to perform transactions with the account tokens. In other words, the implementation of a trust token may allow the communication device to be provisioned with multiple account tokens, without requiring multiple logins or transmissions of sensitive data.

Before discussing specific embodiments and examples, some descriptions of terms used herein are provided below.

An "access device" may be any suitable device that provides access to a system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. The POS terminal may or may not initiate processing of transactions.

An "account token" may include a substitute identifier for some information. For example, a payment token may include an identifier for a payment account that is a substitute for an account identifier, such as a primary account number (PAN). For instance, an account token may include a series of alphanumeric characters that may be used as a substitute for an original account identifier. For example, an account token "4900 0000 0000 0001" may be used in place of a PAN "4147 0900 0000 1234." In some embodiments, an account token may be "format preserving" and may have a numeric format that conforms to the account identifiers used in existing payment processing networks (e.g., ISO 8583 financial transaction message format). In some embodiments, an account token may be used in place of a PAN to initiate, authorize, settle or resolve a payment transaction. The account token may also be used to represent the original credential in other systems where the original credential would typically be provided. In some embodiments, an account token value may be generated such that the recovery of the original PAN or other account identifier from the token value may not be computationally derived. Further, in some embodiments, the account token format may be configured to allow the entity receiving the account token to identify it as an account token and recognize the entity that issued the account token.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "application provider" may be an entity that can provide a service or application.

An "authorization request message" may be a message that requests permission to conduct an interaction. For example, an authorization request message may include an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

An "authorizing entity" may be an entity that authorizes a request. Examples of an authorizing entity may be an issuer, a governmental agency, a document repository, an access administrator, etc. An "authorizing entity computer" may be a computer operated by or associated with an authorizing entity and may be implemented by, for example, a server computer.

A "blockchain" can be a distributed database that maintains a continuously-growing hat of records secured from tampering and revision. A blockchain may include a number of blocks of interaction records recorded on one or more nodes. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a verification network. Any node within the verification network may subsequently use the blockchain to verify transactions.

A "communication device" may comprise any suitable electronic device that may be operated by a user, which may optionally also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include mobile devices (e.g., cellular phones), PDAs, tablet computers, net books, laptop computers, personal music players, handheld specialized readers, watches, fitness bands, ankle bracelets, rings, earrings, etc., as well as automobiles with remote communication capabilities. A communication device may comprise any suitable hardware and software for performing such functions, and may also include multiple devices or components (e.g., when a device has remote access to a network by tethering to another device—i.e., using the other device as a modem—both devices taken together may be considered a single communication device).

A "credential" may comprise any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or a payment device associated with the account). Such information may be directly related to the account or may be derived from information related to the account. Examples of account information may include an "account identifier" such as a PAN (primary account number or "account number"), an eID, a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

A "digital wallet" can include an electronic application or device that allows an individual to conduct electronic commerce transactions. A digital wallet may store user profile information, payment credentials, bank account information, one or more digital wallet identifiers, and/or the like, and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites or systems, transferring funds between users, and/or the like. A digital wallet may be designed to streamline the purchase and payment process. A digital wallet may allow the user to load one or more payment cards onto the digital wallet so as to make a payment without having to enter an account number or present a physical card. A digital wallet may also store transaction records (e.g., electronic receipts).

An "electronic device" may include any device that includes an electronic chip or circuit. In some embodiments, an electronic device may in the form of a payment device such as a credit card, debit card, or prepaid card. In other embodiments, the electronic device could have other forms including wearables (smart watches), vehicles (cars), and local communication devices, such as devices implementing Bluetooth or near-field communication (NFC). In some cases, the electronic device may be a separate device from the communication device. The electronic device may also include a processor and a memory and may store credentials, keys, and/or tokens, including trust tokens, public keys, private keys, account tokens, etc.

"Identity data" may include any suitable string of characters or symbols used to identify an entity (e.g., a person or device), and may comprise an "electronic identity" or "eID". In some embodiments, the electronic identity may be mathematically derived from information associated with a user. For example, in some embodiments, an electronic identity may be a value calculated by hashing one or more input values (e.g., name, country code, etc.) available to multiple entities. In this way, the electronic identity may be independently generated by any entity that has the prerequisite information. An electronic identity may be altered (e.g., hashed and/or encrypted) information associated with a user. For example, in some embodiments, an electronic identity may be derived from a combination of a country code, a name, date of birth, and last four digits of a social security number such as SHA256(USA*JOHN SMITH*19700101*1234). Hashing this value may result in a seemingly random string of characters, such as 754WD2E2513BF546050C2D079FF5D65AB6E318E. In some embodiments, the electronic identity is associated with a passphrase that must be provided in order to access any interaction record associated with the electronic identity. An electronic identity may sometimes be referred to as an "eID" or electronic identifier.

An "issuer" may typically refer to a business entity (e.g., a bank) that maintains an account for a user. An issuer may also issue payment credentials stored on communications devices.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. A "signed key" may include a public key that has been digitally signed by a private key.

A "node" may refer to a computing device. In some embodiments, a node may be attached to a network. A node may be capable of creating, receiving, and/or transmitting data over the network. A node may further be capable of performing calculations and any other computing operations.

"Provisioning" may include a process of providing data for use. For example, provisioning may include providing, delivering, or enabling a token on a device. Provisioning may be completed by any entity within or external to the transaction system. For example, in some embodiments, tokens may be provisioned by an issuer or a transaction processing network onto a mobile device. The provisioned tokens may have corresponding token data stored and maintained in a token vault or token registry. In some embodiments, a token vault or token registry may generate a token that may then be provisioned or delivered to a device.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a Certification Authority (CA) which stores the public key in a database and distributes it to any other entity which requests it. In some embodiments, the public key may be generated by another entity. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on Rivest-Shamir-Adleman (RSA) or elliptic curve cryptography (ECC).

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

"Sensitive data" may refer to information for which protection from unauthorized usage is desired, or information for which privacy protection is desired. For example, sensitive data may refer to confidential information, or may refer to information that can be used by an unauthorized entity to commit fraud such as fraudulent transactions or identity theft. Examples of sensitive data may include trade secret, corporate confidential information, confidential legal documents, government protected data, etc. Examples of sensitive data may also include personal information such as health data, social security number, contact information, location information, and/or financial information such as account identifiers, rewards information, loyalty program information, etc. Sensitive data may also include cryptographic keys that can be used to encrypt or decrypt information.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" is a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "transaction identifier" may be any unique combination of letters, numbers, and/or symbols relating to a particular transaction. For example, with respect to the recording of a new entry on a blockchain, the transaction identifier may be a hash of some or all of the data on the blockchain (eg., the header, the transactions, and/or the entire block). The hash may be unique to that entry on the blockchain, such that no other entries are associated with that hash.

A "transaction processing computer" may include a network of one or more devices that can process and route transaction request messages. An exemplary transaction processing computer may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

A "trust token" may be a certificate or other evidence of authenticity of a user and/or a device associated with the user. The trust token may include any number of pieces of identifying data, including a transaction identifier, a nonce, a source identifier, a destination identifier, identity data (e.g., biometric data, a name, etc.), a digital signature, a key, and/or the like.

A "user device" may comprise any suitable device that may be operated by a user. In some embodiments, a user device may be a limited functionality device (e.g., an "electronic device"). A limited functionality device may be a device that does not have access to the Internet and/or does not have a sophisticated user interface (or does not have a user interface at all). However, a limited functionality device may have certain communication capabilities other than Internet capabilities, such as through Bluetooth or near field communication, for example. In some embodiments, a user device may be an enhanced functionality device (e.g., a "communication device"). An enhanced functionality device may be a device that has access to the Internet and/or has a sophisticated user interface (e.g., a touch screen). A communication device may provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of user devices include mobile phones (e.g., cellular phones), PDAs, tablet computers, net books, laptop computers, personal music players, handheld specialized readers, watches, fitness bands, wearables, ankle bracelets, rings, earrings, key fobs, physical wallets, glasses, containers, coffee mugs, takeout containers, etc., as well as automobiles with remote communication capabilities. A user device may comprise any suitable hardware and software for performing such functions, and may also include multiple devices or components (e.g., when a user device has remote access to a network by tethering to another device—i.e., using the other device as a modem—both devices taken together may be considered a single user device).

I. Account Token Provisioning System

Many entities implement an account token provisioning system 100 such as that shown in FIG. 1. System 100 may be used to obtain an account token to be used by a communication device 110 as a substitute for sensitive data. System 100 includes a communication device 110, an authorizing entity computer 120, and a token server 130.

The communication device 110 may be used by a user to request and provision an account token. At step S101, a user may enter account data into the communication device 110, and the account data may be transmitted from the communication device 110 to an authorizing entity computer 120. The account data may be included in a request for an account token to substitute sensitive data. The account data may include, for example, a user name and password, and/or may include sensitive data, such as a credential, PII, etc.

The authorizing entity computer 120 may be associated with an authorizing entity that issued the sensitive data to be substituted by the account token. For example, if the sensitive data is a credential, the authorizing entity computer 120 may be associated with the issuer of the credential (i.e., the entity that issued the credential to the user of the communication device 110). At step S102, the authorizing entity computer 120 may verify the account data (e.g., verify the correct user name and password associated with the sensitive data), and transmit a verification of the account data to the communication device 110.

At step S103, the authorizing entity computer 120 may further transmit a verification of the account data to the token server 130. The verification may include, for example, an identifier of the communication device 110 and/or the user of the communication device 110, an indication of authentication of the communication device 110 and/or the user of the communication device 110, as well as the sensitive data, in some embodiments. At step S104, the communication device 110 may generate and transmit a request for an account token to the token server 130. The request may include, for example, the identifier of the communication device 110 and/or the user of the communication device 110, as well as the sensitive data, in some embodiments.

Responsive to the request, the token server 130 may generate an account token as substitute for the sensitive data. The token server 130 may store the sensitive data in association with the account token in a lookup table or other database object. At step S105, the token server 130 may push the account token to the communication device 110. The account token may be provisioned onto the communication device 110 and may be used by the communication device 110 to perform transactions. This process may be repeated for each account token to be provisioned onto the communication device 110, which may be time consuming and inefficient if a large number of account tokens are desired to be used on the communication device 110.

II. Account Token Provisioning System Using a Trust Token

In order to streamline the process described with respect to FIG. 1, an account token provisioning system 200 using a trust token may be implemented. System 200 may be used to obtain an account token to be used by a communication device 210 as a substitute for sensitive data. System 200 includes a communication device 210, an authorizing entity computer 220, a token server 230, and a blockchain 240.

The communication device 210 may be used by a user to request and provision an account token using a trust token. The user may use the communication device 210 to generate a first public-private key pair specific to the communication device 210. The user may enter account data into the communication device 210. The account data may be included in a request for an account token to substitute sensitive data. The account data may include, for example, a user name and password, and/or may include sensitive data, such as a credential, PII, etc.

The communication device 210 may sign the first public key with the first private key to form a signed key. The account data and the signed key formed by the signing of the first public key by the first private key may be transmitted from the communication device 210 to an authorizing entity computer 220.

The authorizing entity computer 220 may be associated with an authorizing entity that issued the sensitive data to be substituted by the account token. For example, if the sensitive data is a credential, the authorizing entity computer 220 may be associated with the issuer of the credential (i.e., the entity that issued the credential to the user of the communication device 210). In some embodiments, the authorizing entity computer 220 may be or be associated with a federated public key infrastructure (PKI) operator. The authorizing entity computer 220 may verify the account data (e.g., verify the correct user name and password associated with the sensitive data). The authorizing entity computer 220 may further verify the signed key. The authorizing entity computer 220 may transmit the first public key, as well as an indication of verification of the account data and/or the signed key, to one or more nodes of a blockchain 240.

The one or more nodes of the blockchain 240 may generate a second public-private key pair specific to the user of the communication device 210. In other words, the second public-private key pair may be applicable to all devices operated by or associated with the user, and not just the communication device 210. The one or more nodes of the blockchain 240 may digitally sign the first public key with the second private key to generate a digital signature corresponding to the user and the communication device 210. The one or more nodes of the blockchain 240 may record the digital signature. In some embodiments, the one or more nodes of the blockchain 240 may further record the first public key. In some embodiments, the blockchain 240 (that is, any of the nodes that contain the blockchain) may assign a transaction identifier or hash to the block record of the digital signature. The transaction identifier, in some embodiments, may be equivalent to the digital signature, may be a hash of the digital signature, or may be a hash of any of the data in the block record. The one or more nodes of the blockchain 240 may transmit the digital signature to the authorizing entity computer 220. The authorizing entity computer 220 may generate a trust token using the digital signature and transmit the trust token to the communication device 210. In some embodiments, the trust token may further include the transaction identifier, a source identifier, a destination identifier, a nonce, a biometric identifier, and/or the like.

The communication device 210 may generate and transmit a request for an account token to a token server 230. The token server 230 may be an example of a recipient computer that receives a request for an account token. The request may include, for example, the trust token, as well as the sensitive data, in some embodiments. Responsive to the request, the token server 230 may transmit the trust token and/or the digital signature to one or more nodes of the blockchain 240. The one or more nodes of the blockchain 240 may then compare the digital signature received from the communication device 210 to the digital signature on the blockchain 240 in order to authenticate the digital signature received from the communication device 210.

If the digital signature has been verified, the one or more nodes of the blockchain 240 may generate a verification and transmit the verification to the token server 230. Responsive to the verification, the token server 230 may generate an account token as a substitute for the sensitive data. The token server 230 may store the sensitive data in association with the account token in a lookup table or other database object for later retrieval and translation. The token server 230 may push the account token to the communication device 210. The account token may be provisioned onto the communication device 210 and may be used by the communication device 210 to perform transactions. To request additional account tokens, the communication device 210 may provide the trust token to the same or additional token servers 230 providing account tokens for sensitive data. It may not be necessary for the communication device 210 to provide separate and potentially different account data for each account token to be requested.

A. Trust Token

Figure 3:
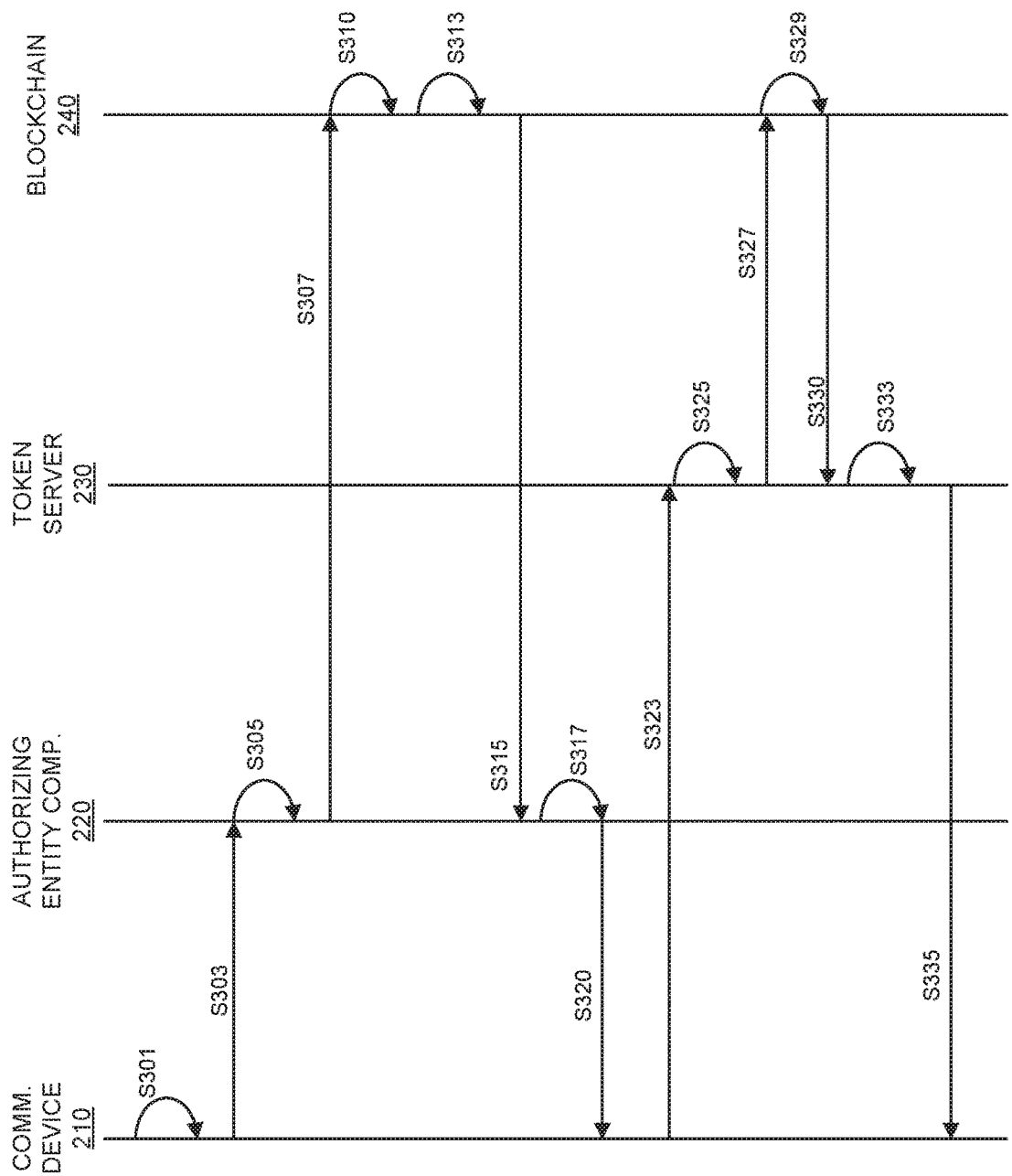
FIG. 3 shows a flow diagram of a method for generating and using a trust token according to some embodiments of the present invention.

FIG. 3 shows a flow diagram of a method for generating and using a trust token according to some embodiments of the present invention. At step S301, the communication device 210 may generate a first public key and a first private key associated with and/or specific to the communication device 210. The communication device 210 may further generate a signed key including the first public key signed by the first private key. At step S303, the communication device 210 may transmit the signed key and account data to the authorizing entity computer 220. The account data may be included in a request for an account token to substitute sensitive data. The account data may include, for example, a user name and password, and/or may include sensitive data, such as a credential, PII, etc. The account data may further include an identifier, such as a user identifier associated with the user of the communication device 210 or a device identifier associated with the communication device 210.

In some embodiments, the signed key may further be encrypted. In some embodiments, the signed key may be encrypted with a public key associated with the authorizing entity computer 220. The public key associated with the authorizing entity computer 220 may be stored in a database of a server computer and freely distributed to any requesting entity, including the communication device 210. This may provide an additional layer of security, as only the proper corresponding private key held by the proper authorizing entity computer 220 will properly decrypt the signed key.

At step S305, the authorizing entity computer 220 may verify the account data (and in some embodiments, the signed key). In some embodiments in which an encrypted signed key is received from the communication device 210, the authorizing entity computer 220 may further decrypt the signed key using its own private key to obtain the signed key (i.e., the first public key signed by the first private key). Once verified, the authorizing entity computer 220 may transmit the first public key to one or more nodes of the blockchain 240 at step S307. At step S310, the one or more nodes of the blockchain 240 may generate a second public key and a second private key associated with and/or specific to the user of the communication device 210. For example, a single second public key and second private key may be associated with a user operating multiple communication devices 210, while each communication device 210 may have a unique first public key and first private key.

At step S313, the one or more nodes of the blockchain 240 may digitally sign the first public key with the second private key to generate a digital signature. The digital signature may be associated with the user and the communication device 210 in that the first public key is associated with the communication device and the second private key is associated with the user. At step S315, the one or more nodes of a blockchain 240 may transmit the digital signature to the authorizing entity computer 220.

At step S317, the authorizing entity computer 220 may generate a trust token using the digital signature. In some embodiments, the trust token may include additional data, such as the signed key received from the communication device 210, the transaction identifier, a nonce, identity data (e.g., biometric data, a name, etc.), a source identifier, a destination identifier, and/or the like. This information may be obtained from the blockchain 240 or may be separately obtained by the authorizing entity computer 220. For example, the nonce may have been generated by the communication device 210 and transmitted to the authorizing entity computer 220 along with its initial communication. At step 3320, the authorizing entity computer 220 may transmit the trust token to the communication device 210.

At step S323, the communication device 210 may generate and transmit a request for an account token to the token server 230. The token server 230 may be an example of a recipient computer that receives a request for an account token. The request may include the trust token, as well as the sensitive data to be represented by the account token, in some embodiments. Responsive to the request, at step S325, the token server 230 may extract the digital signature from the trust token. At step S327, the token server 230 may transmit the digital signature from the communication device 210 to one or more nodes of the blockchain 240.

The one or more nodes of the blockchain 240 may verify the digital signature from the communication device 210 by comparing it to the digital signature previously recorded on the blockchain 240 at step S329. In some embodiments, the one or more nodes of the blockchain 240 may only compare the second private key signing the digital signature received from the communication device 210 to the second private key signing the digital signature recorded on the blockchain 240. At step S330, the one or more nodes of the blockchain 240 may transmit a verification of the digital signature to the token server 230. At step S333, the token server 230 may analyze the verification received from the blockchain 240. If the digital signatures match, then the user and the communication device 210 are authenticated.

At step S335, the token server 230 may generate an account token corresponding to the sensitive data and transmit the account token to the communication device 210. The communication device 210 may be provisioned with the account token. To request additional account tokens, the communication device 210 may provide the trust token to the same or additional token servers 230 providing account tokens for sensitive data. It may not be necessary for the communication device 210 to provide separate and potentially different account data for each account token to be requested.

Figure 4:
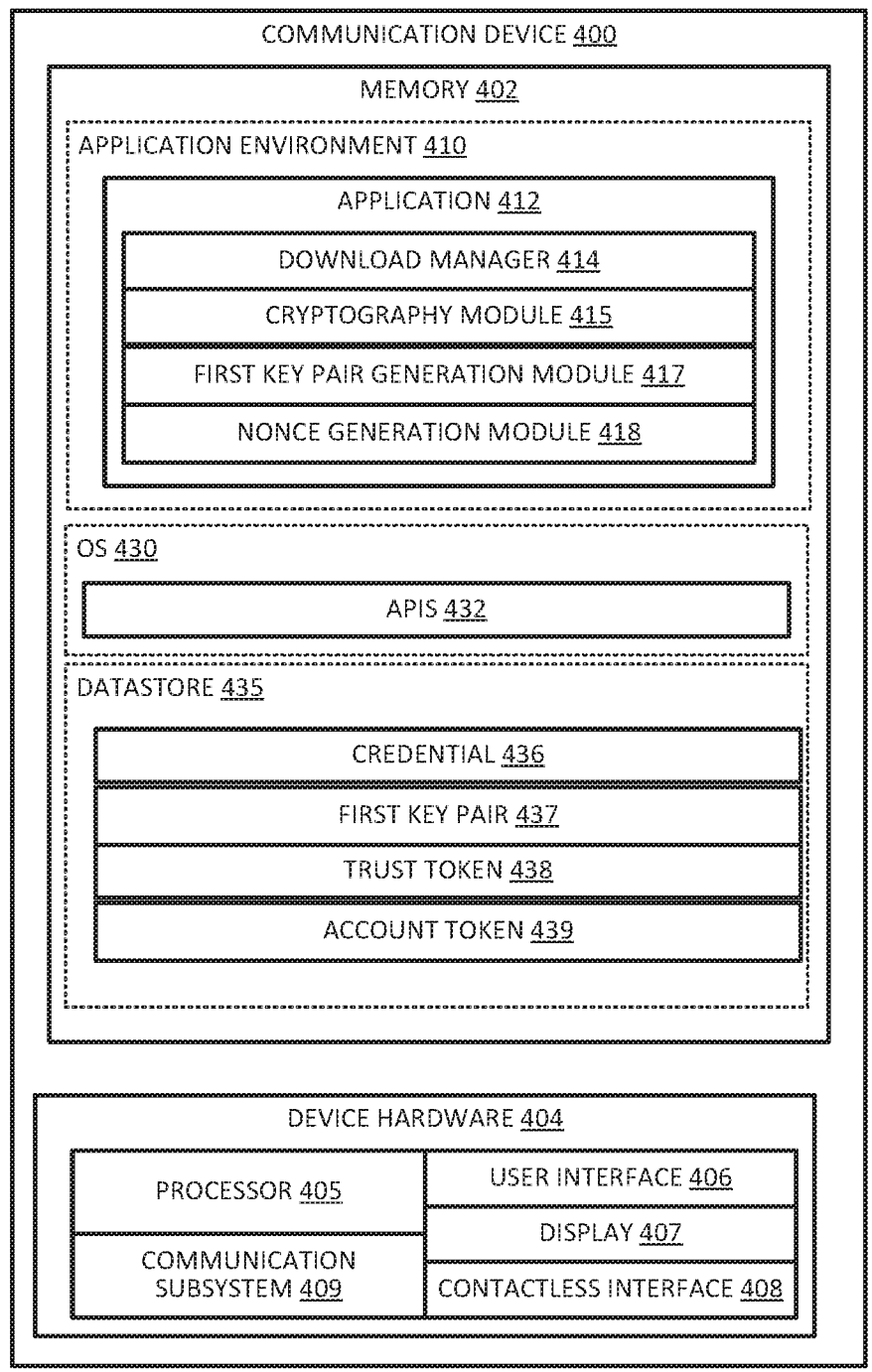
FIG. 4 shows a block diagram of a communication device according to some embodiments of the present invention.

FIG. 4 shows a block diagram of a communication device 400 according to some embodiments of the present invention. Communication device 400 can be used, for example, to implement communication device 210 of FIG. 2. Communication device 400 may include device hardware 404 coupled to a memory 402. Device hardware 404 may include a processor 405, a user interface 406, a contactless interface 408, and a communication subsystem 409. In some embodiments, device hardware 404 may include a display 407 (which can be part of user interface 406).

Processor 405 can be implemented as one or more integrated circuits (e.g., one or more single core or multicore microprocessors and/or microcontrollers), and is used to control the operation of the communication device 400. Processor 405 can execute a variety of programs in response to program code or computer-readable code stored in memory 402, and can maintain multiple concurrently executing programs or processes. Communication subsystem 409 may include one or more RF transceivers and/or connectors that can be used by communication device 400 to connect with external networks (e.g., to connect to the authorizing entity computer 220 and/or the token server 230). Communication subsystem 409 may act in conjunction with the contactless interface 408 to communicate locally with other devices (e.g., an access device), such as to transmit an account token 439 during a transaction. Contactless interface 408 may include one or more specialized RF transceivers (e.g., near field communication (NFC) transceivers) to interact with a contactless reader of an access device to conduct a transaction (e.g., payment transaction, access transaction, information exchange, etc.). In secure element based implementations, only a secure element (not shown) may have access to contactless interface 408. In some embodiments, contactless interface 408 can be accessed by the mobile OS 430 using specialized card emulation APIs 432 without requiring the use of a secure element. In some embodiments, display 407 can also be part of contactless interface 408, and is used, for example, to perform transactions using bar codes, OR codes, etc. User interface 406 can include any combination of input and output elements to allow a user to interact with and invoke the functionalities of the communication device 400. In some embodiments, user interface 406 may include a component such as display 407 that can be used for both input and output functions.

Memory 402 can be implemented using any combination of any number of non-volatile memories (e.g., flash memory) and volatile memories (e.g., DRAM, SRAM), or any other non-transitory storage medium, or a combination thereof media. Memory 402 may store an operating system (OS) 430, an application environment 410 where one or more applications reside including application 412 to be executed by processor 405, and a datastore 435. The datastore 435 may store a credential 436, a first key pair 437 (e.g., a first public key and a first private key), a trust token 438, and an account token 439. The credential 436 and/or the account token 439 may be provisioned on the communication device 400. The credential 436, the first key pair 437, the trust token 438, and the account token 439 may be provided to other systems or devices using the communication subsystem 409 or the contactless interface 408 and the processor 305. In some embodiments, the first key pair 437 may additionally or alternatively be stored as a signed key (i.e., the first public key signed by the first private key).

Application 412 can be an application that uses, accesses, and/or stores credentials (e.g., credential 436), tokens (e.g., account token 439 and/or trust token 438), and/or cryptographic keys (e.g., first key pair 437). For example, application 412 can be a wallet or payment application that facilitates authentication of the communication device 400 and/or the user of communication device 400 and uses credentials or tokens to conduct transactions via the communication device 400. In some embodiments, access to application 412 by a user can be protected by user authentication data such as a password, passcode, PIN, etc. For example, when a user attempts to launch or execute application 412, the user may be requested to enter valid user authentication data before the user can access application 412. Application 412 may include a download manager 414, a cryptography module 415, a first key pair generation module 417, and/or a nonce generation module 418. In some embodiments, one or more of these components can be provided by another application or component that is not part of application 412, or some of these components may be omitted.

Download manager 414 can be configured to, in conjunction with processor 405, provide functionalities to communicate with an authorizing entity computer (e.g., authorizing entity computer 220) and/or a recipient computer (e.g., token server 230) to download information. Download manager 414 may, in conjunction with processor 405, request or otherwise manage the acquisition, activation and/or storage of credentials, trust tokens and/or account tokens. For example, download manager 414 may, in conjunction with processor 405, request an account token via the application provider or token server associated with application 412. Upon activation, the account token may be associated with a selected credential, such as credential 436. In some embodiments, the credential provided to the application provider can be provided in an encrypted form. For example, the credential can be encrypted with a session key generated by the communication device 400. Download manager 414 may also, in conjunction with processor 405, receive pushed tokens.

Cryptography module 415, in conjunction with processor 405, may provide cryptographic functionalities for application 412. For example, cryptography module 415 may, in conjunction with processor 405, implement and perform encryption/decryption operations for application 412 using encryption algorithms such as DES, AES, TDES/TDEA, or the like, and/or hash functions such as SHA, or the like. For example, when application 412 accesses data stores within memory 402 to retrieve and use credentials or tokens stored therein, application 412 may invoke cryptography module 415 to, in conjunction with processor 405, decrypt the key that is used to encrypt the stored credentials or tokens, and then decrypt the credential or token using the decrypted key. The decrypted credential or token can then be used by application 412.

First key pair generation module 417 may, in conjunction with processor 405, generate a first key pair associated with or specific to the communication device 400. The first key pair may include a first public key and a first private key. First key pair generation module 417 may further, in conjunction with processor 405, sign the first public key with the first private key to generate a signed key. In some embodiments, first key pair generation module 417 may further, in conjunction with processor 405, encrypt the signed key. The signed key may be encrypted, for example, with a public key associated with an issuing entity (e.g., authorizing entity computer 220 that issued credential 436 or a PKI operator), to whom the signed key may be transmitted. The public key associated with the issuing entity may be stored in a database of a server computer and freely distributed to any requesting entity, including the communication device 400. This may provide an additional layer of security, as only the proper corresponding private key held by the proper issuing entity will properly decrypt the signed key.

In some embodiments, communication device 400 may further include a nonce generation module 418. The nonce generation module 418 may generate an arbitrary, one time use, and/or random number to transmit to an issuing entity (e.g., authorizing entity computer 220). The issuing entity may use the nonce to generate the trust token 438 that is ultimately transmitted back to the communication device 400 and stored in datastore 435.

Figure 5:
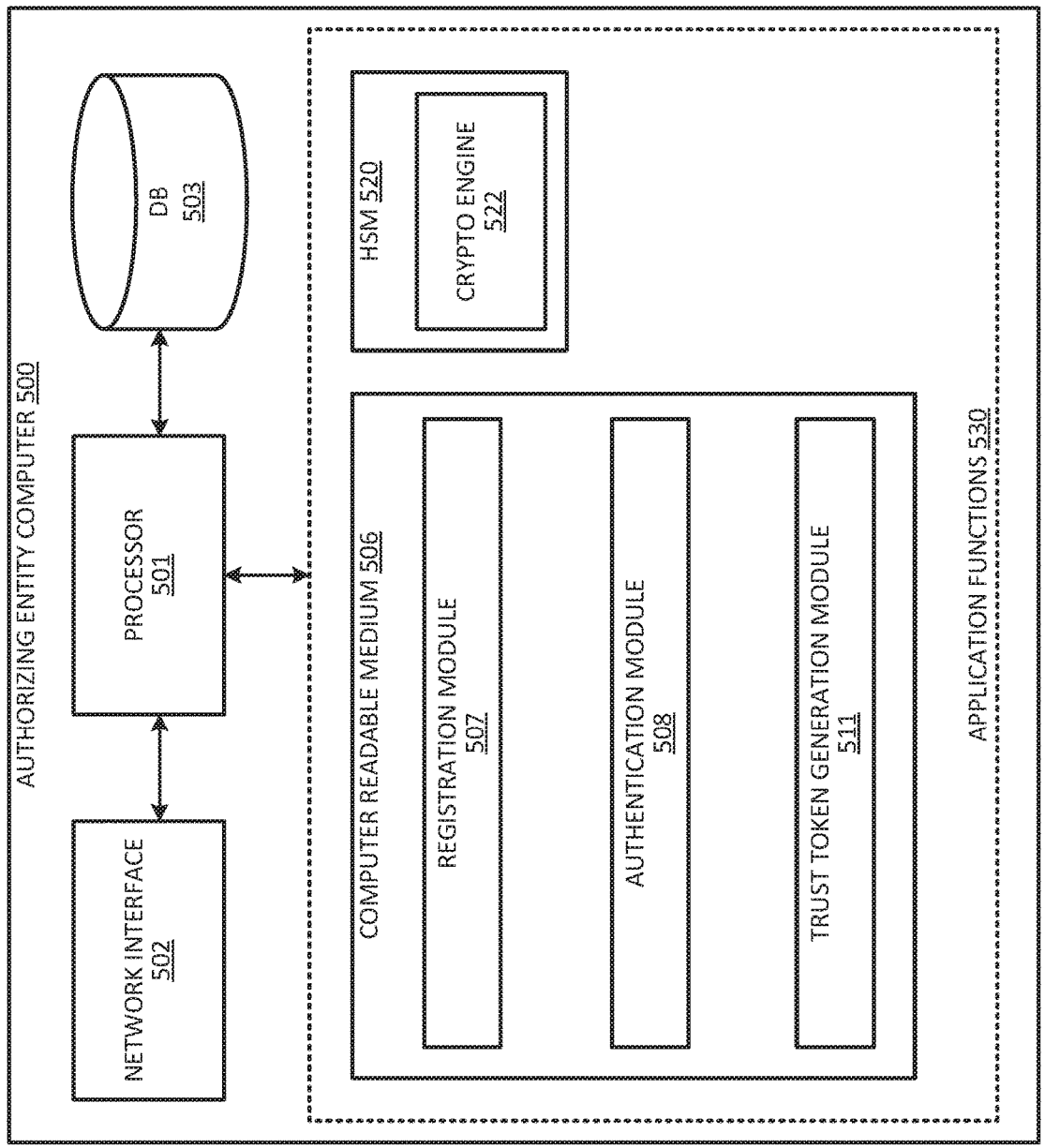
FIG. 5 shows a block diagram of an authorizing entity computer according to some embodiments of the present invention.

FIG. 5 shows a block diagram of an authorizing entity computer 500 associated with, for example, an issuing entity and/or a federated PKI operator, according to some embodiments of the present invention. For example, authorizing entity computer 500 can be authorizing entity computer 220 of FIG. 2, who issues a credential or account associated with a user of a communication device. Authorizing entity computer 500 may include a processor 501 coupled to a network interface 502 and a computer readable medium 506. In some embodiments, authorizing entity computer 500 may also include a hardware security module (HSM) 520. Authorizing entity computer 500 may also include or otherwise have access to a database 503 that may be internal or external to authorizing entity computer 500.

Processor 501 may include one or more microprocessors to execute program components for performing the second key pair generation and trust token generation functions 530 of authorizing entity computer 500. Network interface 502 can be configured to connect to one or more communication networks to allow authorizing entity computer 500 to communicate with other entities such as the communication device operated by a user, a token server, a blockchain etc. Computer readable medium 506 may include any combination of one or more volatile and/or non-volatile memories, for example, RAM, DRAM, SRAM, ROM, flash, or any other suitable memory components. Computer readable medium 506 may store code executable by the processor 501 for implementing some or all of the second key pair generation and trust token generation functions 530 of authorizing entity computer 500. For example, computer readable medium 506 may include code implementing a registration module 507, an authentication module 508, and a trust token generation module 511. In some embodiments, authorizing entity computer 500 may also include a hardware security module (HSM) 520 to implement a cryptography engine 522.

Registration module 507 may, in conjunction with processor 501, register users with authorizing entity computer 500. For example, a user can be registered with the authorizing entity by providing registration module 507 with user identifying information to identify the user, device information such as a device identifier associated with the user's communication device on which an application associated with the application provider is installed, account information such as an account identifier or credential associated with the user's account, etc. In some embodiments, a user may set up user authentication data (e.g., password, passcode, PIN, etc.) via registration module 507. The user authentication data can be used by the authentication module 508 to authenticate the user when the application on the user's communication device communicates with authorizing entity computer 500. Registration module 507 may also, in conjunction with processor 501, allow a user to change or update the user authentication data. The registration information can be stored in a database 503. In some embodiments, the registration process can be carried out when the user first downloads the application for installation on the user's communication device, or when the user first launches and executes the application.

The trust token generation module 511 may, in conjunction with the processor 501, transmit the first public key to one or more nodes of a blockchain, receive a digital signature from the one or more nodes, and generate a trust token using the digital signature. The trust token may include additional data, such as the signed key received from the communication device (i.e., the first public key signed by the first private key), a transaction identifier, a nonce, identity data (e.g., biometric data, a name, etc.), a source identifier, a destination identifier, and/or the like. The nonce may have been generated by the communication device and received by the authentication module 508. The trust token generation module 511 may, in conjunction with the processor 501 and the network interface 502, transmit the trust token to the communication device.

Cryptography engine 522 may, in conjunction with processor 501, provide cryptographic functionalities for authorizing entity computer 500. In some embodiments, cryptography engine 522 can be implemented in HSM 520, which is a specialized hardware component used to perform cryptographic operations and manage cryptographic keys. Cryptography engine 522 may, in conjunction with processor 501, implement and perform encryption/decryption operations for authorizing entity computer 500 using encryption algorithms such as such as AES, DES, TDES/TDEA, or other suitable encryption algorithms using cryptographic keys of any length (e.g., 56-bit, 128-bit, 169-bit, 192-bit, 256-bit, etc.). In some embodiments, cryptography engine 522 can also perform hash calculations using hash functions such as secure hash algorithm (SHA), or the like.

For example, the cryptography engine 522 may receive an encrypted signed key from the communication device (e.g., as generated by first key pair generation module 417 of FIG.

4). The cryptography engine 522 may, in conjunction with the processor 501, retrieve its associated private key (e.g., from database 503) and use the private key to decrypt the encrypted signed key. In other words, the signed key may be encrypted asymmetrically, in that the public key may be used to encrypt it, but the private key may be used to decrypt it. Once the signed key is decrypted, it may be interpreted for the first public key and the first private key.

Figure 6:
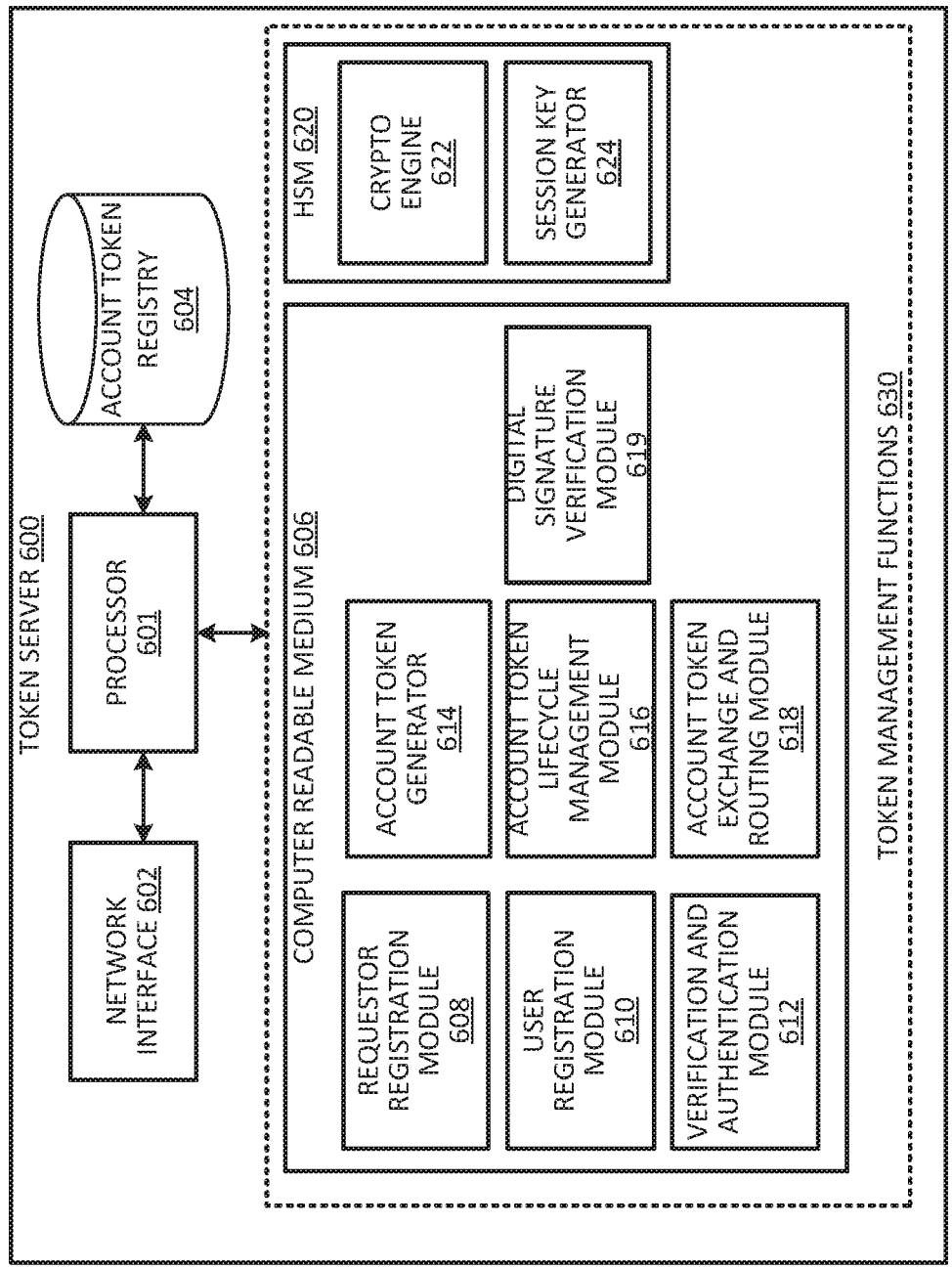
FIG. 6 shows a block diagram of a token server according to some embodiments of the present invention.

FIG. 6 shows a block diagram of a token server 600 according to some embodiments of the present invention. For example, token server 600 can be token server 230 of FIG. 2. Token server 600 may be used to generate, activate, maintain and manage account tokens, as described further herein. Token server 600 may be an example of a recipient computer that receives requests for account tokens. Token server 600 may further be used to transmit digital signatures received from communication devices to one or more nodes of a blockchain for verification before issuing account tokens. In some embodiments, one or more token servers 600 can be used, for example, to implement a network token system.

Token server 600 may include a processor 601 coupled to a network interface 602 and a computer readable medium 606. In some embodiments, token server 600 may also include a hardware security module (HSM) 620. Token server 600 may also include an account token registry 604 that may be internal or external to token server 600.

Processor 601 may include one or more microprocessors to execute program components for performing the token management functions 630 of token server 600. Network interface 602 may be configured to connect to one or more communication networks to allow token server 600 to communicate with other entities such as a communication device operated by a user, an authorizing entity computer, a blockchain, etc. Computer readable medium 606 may include any combination of one or more volatile and/or non-volatile memories, for example, RAM, DRAM, SRAM, ROM, flash, or any other suitable memory components. Computer readable medium 606 may store code executable by the processor 601 for implementing some or all of the token management functions 630 of token server 600 described herein. For example, computer readable medium 606 may include a requester registration module 608, a user registration module 610, an account token generator 614, a verification and authentication module 612, an account token exchange and routing module 616, an account token life-cycle management module 618, and a digital signature verification module 619.

The digital signature verification module 619 may, in conjunction with processor 501, receive a trust token from a communication device requesting an account token. The digital signature verification module 619 may, in conjunction with processor 501, extract the digital signature from the trust token. The digital signature verification module 619 may, in conjunction with processor 501, transmit the digital signature extracted from the trust token to one or more nodes of the blockchain and receive verification of the digital signature from the communication device against the digital signature on the blockchain. If the digital signatures match, the account token generation and provisioning functions may proceed as described herein.

Requestor registration module 608 may, in conjunction with processor 601, register an account token requestor entity (e.g., a communication device) with the account token registry 604, and generate an account token requestor identifier (ID) for the registered entity. Each registered entity can use their respective account token requestor ID as part of an account token service request to facilitate identification and validation of the entity. In some embodiments, an account token requestor entity may provide account token requestor information to the requestor registration module 608 such as an entity name, contact information, an entity type (e.g., a user, merchant, wallet provider, payment service provider, issuer, payment enabler, acquirer, etc.). In some embodiments in which the account token is transaction related, the account token requestor information may also include account token presentment modes (e.g., scan, contactless, e-commerce, etc.), account token type (e.g., static/dynamic, payment/non-payment), integration and connectivity parameters, and services subscribed (e.g., account token request, authentication and verification, life-cycle management, etc.) and any other relevant information for the onboarding process.

User registration module 610 may, in conjunction with processor 601, perform registration of users and accounts of the users. In some embodiments, token server 600 may allow authorized entities to register consumer accounts (e.g., payment or financial accounts) with the network token system on behalf of the users. For example, a registered account token requestor may provide an account token requestor ID (e.g., received at the time of registration from the requestor registration module 608), an account identifier or other sensitive information or sensitive information identifier for which an account token can substitute, a user name and contact information, device identifier of the user's communication device, an account token type, and any other relevant information for individual account registration or bulk account registration. In some embodiments, user registration module 610 may, in conjunction with processor 601, store the account details and sensitive information in account token registry 604 for all successful activation and registration requests. In some embodiment, an authorized entity may also unregister users and accounts by providing the necessary information to token server 600.

Account token generator 614 can be programmed to, in conjunction with processor 601, generate an account token or retrieve a credential in response to processing a request for an account token or credential from an account token requestor (e.g., a communication device), in conjunction with processor 601. Further, account token generator 614 can be programmed to, in conjunction with processor 601 generate verification values, such as CVNs and TAVVs. In some embodiments, account token generator 614 may receive an account token requestor ID and an account identifier or sensitive information identifier. In some embodiments, account token generator 614 may also, in conjunction with processor 601, receive optional information such as a user name, a user address and zip code, a requested account token or sensitive information type (e.g., static, dynamic, non-payment, etc.), device identifier, and/or suitable information. In some embodiments, account token generator 614 may, in conjunction with processor 601, generate a response with the requested token or requested credential, an account token expiration date associated with the account token, and/or an account token assurance level associated with the account token. In some embodiments, account token generator 614 may, in conjunction with processor 601, validate the account token requestor ID and maintain the correlation between the account token, the sensitive information or account identifier being substituted by the account token, and the associated account token requestor. In some embodiments, account token generator 614 may, in conjunction with processor 601, determine if an account token already exists in account token registry 604 for a token request before generating a new account token. In some embodiments, if an account token cannot be provisioned, the account token response may include a corresponding reason code. In some embodiments, account token generator 614 may also, in conjunction with processor 601, provide an interface to the account token requesters to submit a bulk account token request file.

Account token generator 614 may, in conjunction with processor 601, determine a token range to assign the account token. The token range may be assigned based on whether the authorizing entity is provisioning the account token (e.g., issuer assigned token range) or the transaction processing computer is provisioning the token on behalf of the authorizing entity (e.g., transaction processing network assigned token range). As an example, if the transaction processing network assigned token range includes "442400000-442400250," then "4424000000005382" may be assigned as a token value. Account token registry 604 may, in conjunction with processor 601, store the relationship of the token range to the account identifier, and an account token add record may be logged. In some embodiments, account token generator 614 may, in conjunction with processor 601, consider the token range list associated with the account identifier range before assigning an account token.

Verification and authentication module 612 may, in conjunction with processor 601, be configured to execute a consumer verification and authentication process, and determine a token assurance level based on the outcome of the verification and authentication process. For example, the verification and authentication module 612 can perform consumer authentication and verification through a configured authentication scheme. In some embodiments, the authentication scheme may include verification of the account identifier, verification values, and the expiration date based on the customer information stored in a database associated with the transaction processing network. In some embodiments, the authentication scheme may include direct verification of the consumer by the issuer using consumer credentials for their online banking system.

In some embodiments, the authentication scheme may include verification of the consumer credentials through the issuer ACS (Access Control Server). For example, the issuer ACS service may be part of an authentication protocol such as 3-D secure protocol by Visa®. The ACS server may be associated with an issuer that may include registered consumer account and access information. The ACS can give issuers the ability to authenticate a consumer during an online purchase, thereby reducing the likelihood of fraudulent use of the consumer account. For example, the ACS can validate that the consumer is registered, performs consumer verification at the time of the transaction, and provides digitally signed responses to the merchants. In some embodiments, the authentication scheme may include verification of the account using a transaction processing network consumer authentication service (e.g., Visa™ Consumer Authentication Service (VCAS)). For example, the VCAS service can authenticate the consumer on-behalf of the issuer prior to the authorization process.

In some embodiments, user registration, account token generation, and verification and authentication may be performed as part of processing a single account token request process. In some embodiments, for bulk requests, user registration and account token generation may be performed by processing a bulk file from the account token requestor. In such embodiments, consumer verification and authentication may be performed in a separate step. In some embodiments, the token requestor can request that the authentication and verification process be performed independently multiple times for a particular account to reflect any changes to the levels of assurance for the account token over time.

Account token exchange and routing module 616 may, in conjunction with the processor 601, process requests for the underlying credential (e.g., an account identifier) associated with a given account token. For example, a transaction processing computer, acquirer, issuer, etc. may issue a request for an account token exchange during processing of a transaction. Account token exchange and routing module 616 may, in conjunction with the processor 601, validate that the requesting entity is entitled to make a request for an account token exchange. In some embodiments, account token exchange and routing module 616 may, in conjunction with the processor 601, validate the credential (or other sensitive information) to account token mapping and presentment mode based on the transaction timestamp and the token expiration timestamp. Account token exchange and routing module 616 may, in conjunction with the processor 601, retrieve the account identifier (or other credential) from account token registry 604, and provide it along with the assurance level to the requesting entity. In some embodiments, if the account identifier (or other sensitive information) to account token mapping is not valid for the transaction timestamp and presentment mode, an error message may be provided.

Account token life-cycle management module 618 may, in conjunction with the processor 601, perform life-cycle operations on the account tokens managed by token server 600. Life-cycle operations may include canceling an account token, activating and deactivating an account token, updating account token attributes, renewing an account token with a new expiration date, etc. In some embodiments, the account token life-cycle management module 618 may only activate the token if a flag or other indicator indicates that the user, the communication device, and/or the credential has been authenticated by the authorizing entity or another entity.

In some embodiments, an account token requestor entity may provide an account token requestor ID, an account token number, a life-cycle operation identifier and one or more account token attributes to token server 600 to perform the requested life-cycle operation on a given account token. Account token life-cycle management module 618 may, in conjunction with the processor 601, verify the account token requestor ID and the account token association based on information in account token registry 604. Account token life-cycle management module 618 may, in conjunction with the processor 601, perform the requested life-cycle operation on a given account token, and update the corresponding associations in account token registry 604. Examples of life-cycle operation may include an account token activation operation to activate an inactive, suspended, or temporarily locked account token and its associations; an account token de-activation operation to temporarily lock or suspend an account token; a cancel account token operation to permanently mark an account token and its associations as deleted to prevent any future transactions, etc. In some embodiments, a deleted account token may be used during returns/chargebacks if the same account token was used to submit the corresponding original transactions.

According to some embodiments, token server 600 may include an HSM 620 to perform secure functions such as encryption and decryption operations and generation of cryptographic keys used for the encryption and decryption operations. For example, HSM 620 may include a cryptography engine 622 to execute encryption algorithms such as AES, DES, TDES/TDEA, or other suitable encryption algorithms using cryptographic keys of any length (e.g., 56-bit, 128-bit, 169-bit, 192-bit, 256-bit, etc.). HSM 620 may also implement a session key generator 624 to generate a session key for each account token request that token server 600 processes. The generated session key can be used to encrypt an account token generated or retrieved for the request, and the account token can be provided to the account token requestor in an encrypted form. For example, for each request that token server 600 receives and processes, session key generator 624 may generate a session key that can be unique for each request received from the particular account token requestor, or unique to each request associated with a particular user or account. In some embodiments, the session key can be the same or different than the encryption key that is used to establish the secure communication channel (e.g., TLS, SSL, etc.) between the account token requestor and token server 600. Account token generator 614 may generate or otherwise retrieve an account token or credential to fulfill the request. The session key can be used by cryptography engine 622 to encrypt that account token or credential using an encryption algorithm, and the encrypted account token or credential can be provided to the account token requestor. In some embodiments, the generated session key is also provided to the account token requestor with the encrypted account token or credential.

Although token server 600 and authorizing entity computer 500 have been described with a HSM implementing only some of their functions, it should be understood that other functionalities of the respective computers (e.g., token generation, storage and activation) can be implemented inside a HSM as well. Furthermore, some or all of the respective HSM functionalities can also be implemented outside of a HSM.

Further disclosure about trust tokens may be found in U.S. patent application Ser. No. 15/686,055, filed Aug. 24, 2017, which is herein incorporated by reference in its entirety.

B. Blockchain

Figure 7:
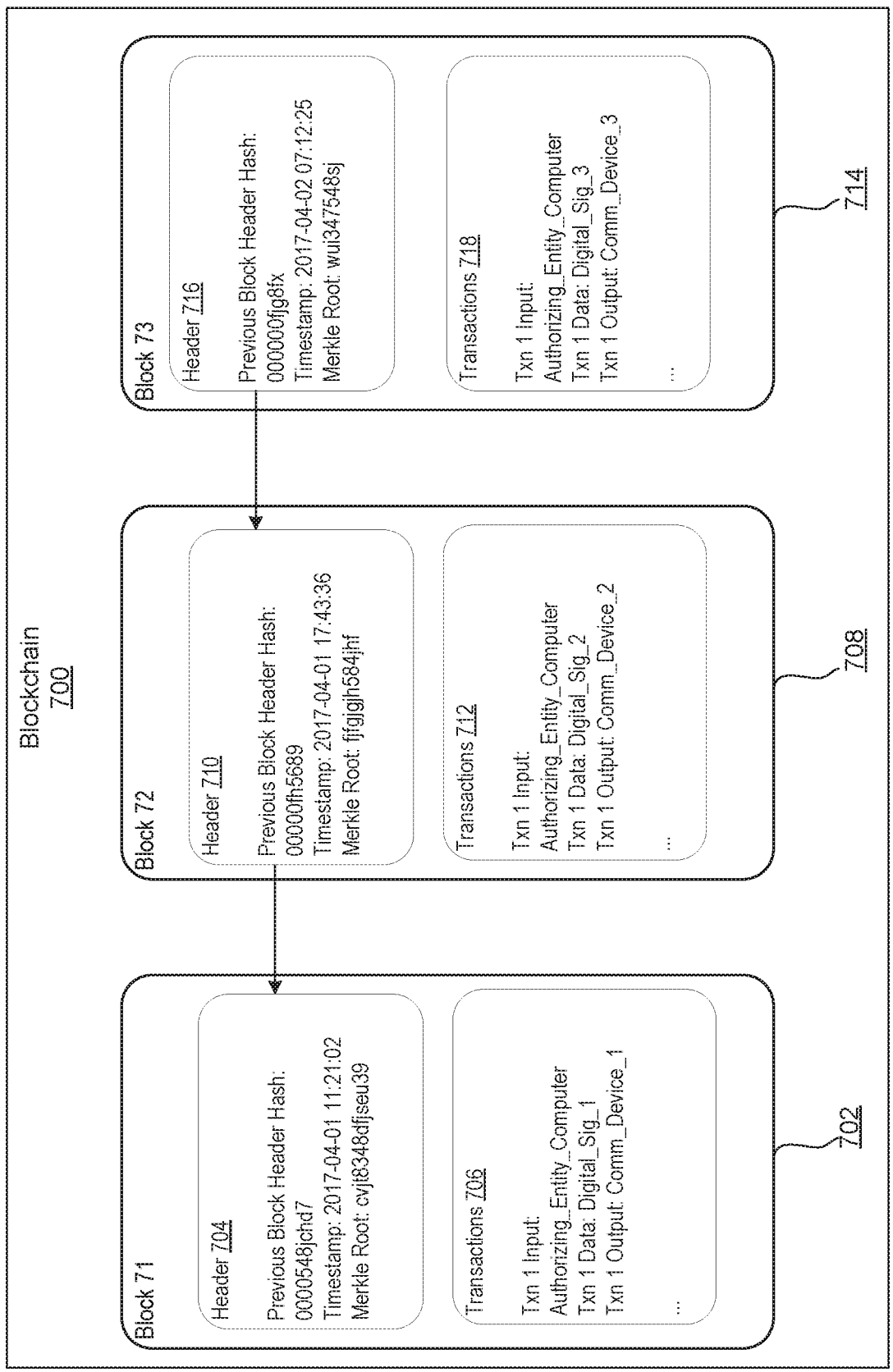
FIG. 7 shows a block diagram of a multi-access blockchain according to some embodiments of the present invention.

FIG. 7 shows a block diagram of a blockchain 700 according to some embodiments of the present invention. Blockchain 700 may be used, for example, to implement blockchain 240 of FIG. 2. Blockchain 700 illustrates three consecutive blocks in an exemplary blockchain: block 702, block 708, and block 714. The blockchain 700 may be a data structure that aggregates transactions for include in the blockchain 700. Each block may include a header and a list of transactions. For example, block 702 may include header 704 and transactions 706. Block 708 may include header 710 and transactions 712. Block 714 may include header 716 and transactions 718.

Headers 704, 710, 716 may include at least three sets of metadata: a previous block header hash, a timestamp, and a merkle root. The previous block header hash may connect each block to the previous block. For example, in header 710 of block 708, "00000fh5689" may be a hash of header 704 of block 702. In other words, a cryptographic hashing algorithm (e.g., SHA256) may be applied any number of times to the header 704 to obtain the value "00000th5689", which may be included in the header 710 of the block 708. The timestamp may be the creation time of the block. For example, block 708 may have been created on Apr. 1, 2017 at 5:43:36 PM. The merkle root may be a hash of the root of the merkle tree of each block's transactions. A merkle tree may be a summary of all of the transactions in a block that is constructed by hashing pairs of nodes until there is only one hash. The last remaining hash is the merkle root.

Transactions 706, 712, 718 may include at least three sets of metadata per transaction: an input, transaction data, and an output. Transactions 706, 712, 718 may be data structures that encode a transfer of data from the input and the output. In some embodiments, a plurality of inputs and/or a plurality of outputs may be specified. The input may be the source of the data to be transferred (i.e., a source identifier). The transaction data may be the data to be transferred. The output may be the destination of the data to be transferred (i.e., a destination identifier). As shown in FIG. 7, there may be no cumulative data maintained by the blockchain 700; instead, the available data may be scattered amongst a plurality of transactions and a plurality of blocks. For example, each communication device associated with a single user may be recorded to separate blocks throughout the blockchain according to when it was recorded.

For example, transactions 706 may include a single data recording transaction sourced from an authorizing entity computer to a first communication device. The data may include a first digital signature. Transactions 712 may include a single data recording transaction sourced from an authorizing entity computer to a second communication device. The data may include a second digital signature. Transactions 718 may include a single data recording transaction sourced from an authorizing entity computer to a third communication device. The data may include a third digital signature. The data in each block may include further fields in some embodiments, such as a transaction identifier, a nonce, and/or the like, as described further herein. In some embodiments, the transaction identifier may be included in the header 704 (e.g., the a header hash or merkle root). Each block 702, 708, 714 and communication device may be associated with the same or a different user. Although each block in this example shows one transaction, in other embodiments, each block can contain multiple transactions.

Implementing a blockchain 700 in lieu of a traditional database in the disclosed embodiments has many advantages. The blockchain 700 is multi-access in that authorizing entities and token servers may both have access to the data recorded therein. This may allow for decentralized and/or shared control of the blockchain. Thus, each entity may verify digital signatures for multiple related or unrelated communication devices. This allows for transparency between entities and ecosystem simplification by adding all transactions to a single blockchain. This decentralization also prevents malicious attacks as the blockchain 700 does not have a central point of failure. In addition, the data written to the blockchain 700 may be immutable once it is written, reducing the possibility of fraud and errors. The blockchain 700 may also allow for faster transactions (e.g., by reducing authentication time) and lower transaction costs (e.g., by eliminating overhead costs associated with maintaining individual log-ins).

III. Implementing a Trust Token Through a Proxy Device

Figure 8:
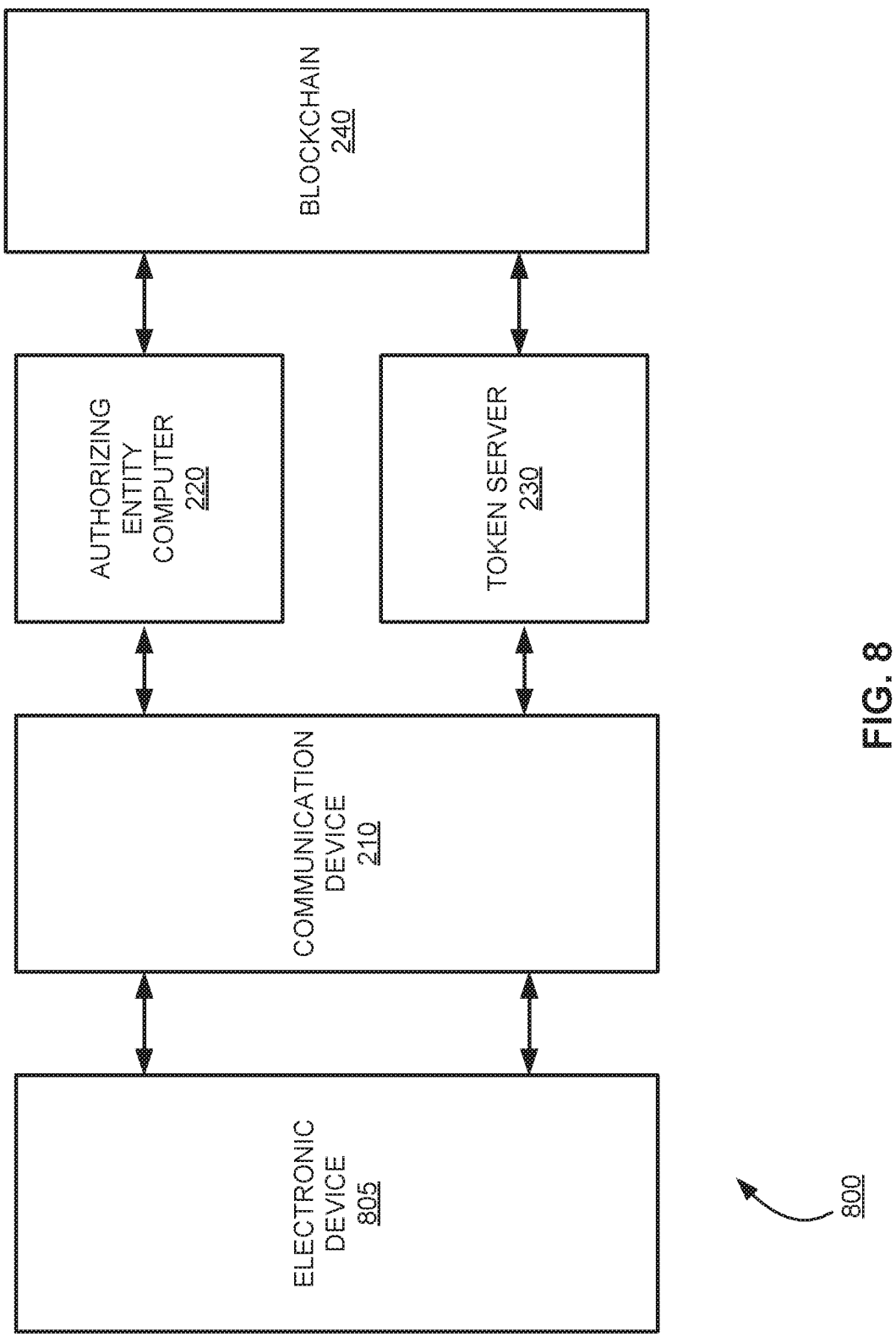
FIG. 8 shows a block diagram of an account token provisioning system implementing a trust token associated with an electronic device according to some embodiments of the present invention.

FIG. 8 shows a block diagram of an account token provisioning system 800 implementing a trust token associated with an electronic device according to some embodiments of the present invention. System 800 may be used to obtain an account token to be used by electronic device 805 as a substitute for sensitive data, through a proxy device (i.e., communication device 210). System 800 includes an electronic device 805, a communication device 210, an authorizing entity computer 220, a token server 230, and a blockchain 240.

In some embodiments, the electronic device 805 may be a non-IP enabled device. For example, the electronic device 805 may only have local communication capabilities (e.g., Bluetooth, Bluetooth LE, near field communication (NFC), etc.), and may not have direct access to the Internet. In some embodiments, communication device 210 may be an IP-enabled device. For example, the communication device 210 may have both local communication capabilities and remote communication capabilities (e.g., access to WiFi, a cellular network, satellite, etc.), and may have direct access to the Internet. Thus, in some embodiments, the communication device 210 may act as a proxy between the electronic device 805 and the authorizing entity computer 220, and the electronic device 805 and the token server 230.

The electronic device 805 may be used by a user to request and provision an account token using a trust token. The user may use the electronic device 805 to generate a first public-private key pair specific to the electronic device 805. The electronic device 805 may sign the first public key with the first private key to generate a first signed key and transmit the first signed key to the communication device 210.

The communication device 210 may receive the first signed key, generate a second public-private key pair specific to the communication device 210, and sign the second public key with the second private key to generate a second signed key. The communication device 210 may transmit the first signed key and the second signed key to the authorizing entity computer 220. The authorizing entity computer 220 may verify the first signed key and the second signed key, and extract the first public key and the second public key. The authorizing entity computer 220 may transmit the first public key and the second public key to one or more nodes of a blockchain 240. The one or more nodes of the blockchain 240 may generate a third public-private key pair specific to the user associated with the electronic device 805 and the communication device 210. In other words, the third public-private key pair may be applicable to all devices operated by or associated with the user, including both the electronic device 805 and the communication device 210 in this embodiment.

The one or more nodes of the blockchain 240 may digitally sign the first public key with the third private key to generate a first digital signature corresponding to the user and the electronic device 805. The one or more nodes of the blockchain 240 may further digitally sign the second public key with the third private key to generate a second digital signature corresponding to the user and the communication device 210. The one or more nodes of the blockchain 240 may record the first digital signature and the second digital signature. In some embodiments, the one or more nodes of the blockchain 240 may assign a first transaction identifier to the block of the first digital signature, and a second transaction identifier to the block of the second digital signature. The one or more nodes of the blockchain 240 may transmit the first digital signature and the second digital signature to the authorizing entity computer 220.

The authorizing entity computer 220 may generate a first trust token using at least the first digital signature. In some embodiments, the first digital signature may include additional data, as described further herein. The authorizing entity computer 220 may transmit the first trust token to the electronic device 805 via the communication device 210. The authorizing entity computer 220 may further generate a second trust token using at least the second digital signature. In some embodiments, the second digital signature may include additional data, as described further herein. The authorizing entity computer 220 may transmit the second trust token to the communication device 210. In some embodiments, the first trust token and/or the second trust token may further include a transaction identifier, a source identifier, a destination identifier, a nonce, a biometric identifier, and/or the like.

The electronic device 805 may generate and locally transmit a request for an account token to the communication device 210. The request may include, for example, the first trust token, as well as the sensitive data, in some embodiments. The communication device 210 may forward the request to the token server 230. The token server 230 may be an example of a recipient computer that receives requests for account tokens. Responsive to the request, the token server 230 may extract the first digital signature from the first trust token and transmit it to one or more nodes of the blockchain 240. The one or more nodes may verify the first digital signature with the previously recorded first digital signature on the blockchain 240. For example, the one or more nodes of the blockchain 240 may compare the first digital signature received from the communication device 210 to the first digital signature received from the blockchain 240 in order to authenticate the first digital signature sourced from the electronic device 805. The one or more nodes of the blockchain 240 may generate a verification and transmit the verification to the token server 230.

If the digital signature has been verified, the token server 230 may generate an account token as a substitute for the sensitive data. The token server 230 may store the sensitive data in association with the account token in a lookup table or other database object for later retrieval and translation. The token server 230 may push the account token to the communication device 210. The communication device 210 may push the account token to the electronic device 805. The account token may be provisioned onto the electronic device 805 and may be used by the electronic device 805 to perform transactions.

To request additional account tokens, the electronic device 805 may provide the first trust token to the same or additional token servers 230 providing account tokens for sensitive data. It may not be necessary for the electronic device 805 to provide separate and potentially different account data for each account token to be requested. In order for the communication device 210 to request account tokens, the communication device 210 may provide the second trust token to the token server 230, and the process may proceed as described above with respect to FIGS. 2 and 3.

Figure 9:
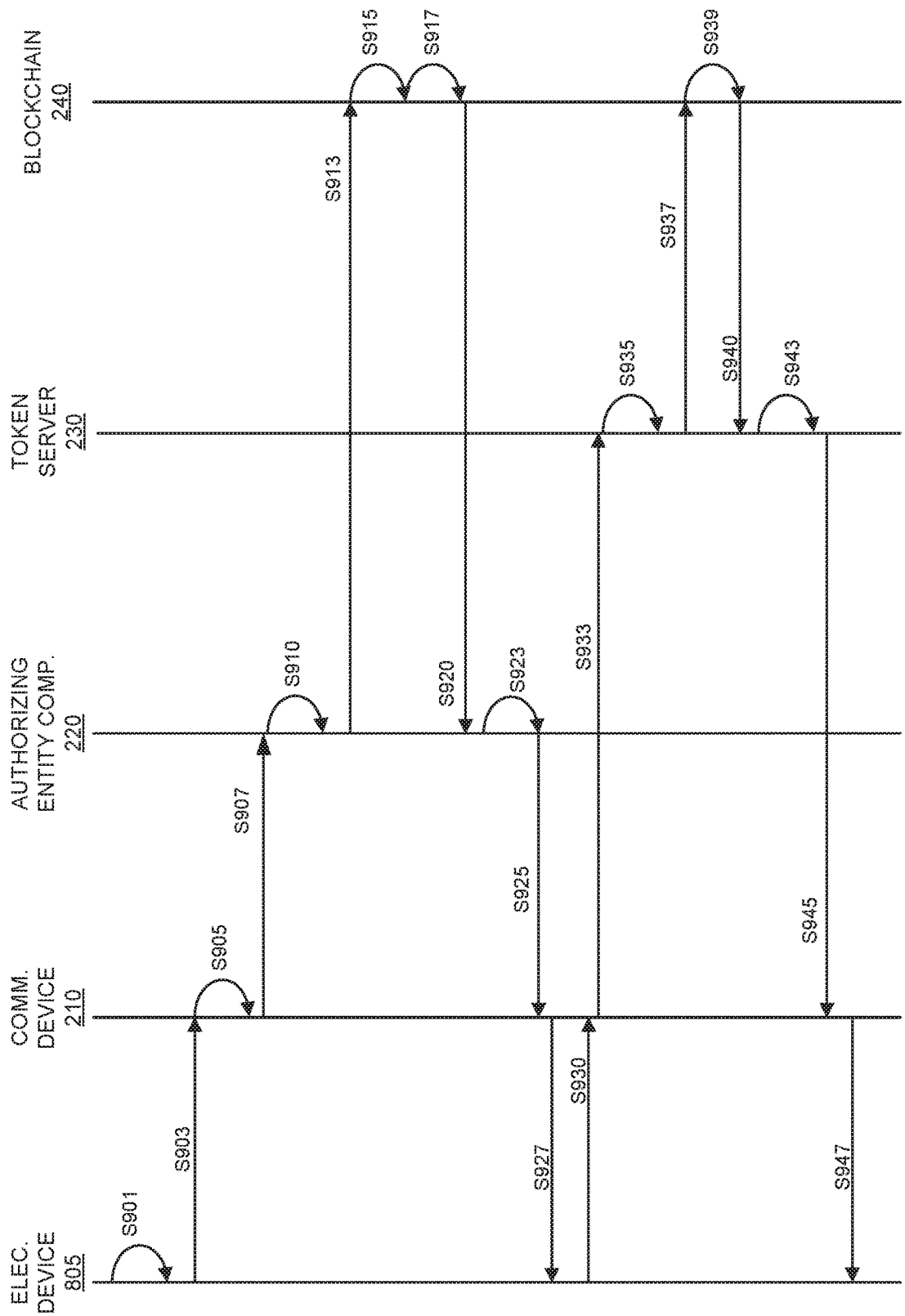
FIG. 9 shows a flow diagram of a method for generating a trust token for an electronic device according to some embodiments of the present invention.

FIG. 9 shows a flow diagram of a method for generating a trust token for an electronic device according to some embodiments of the present invention. At step S901, the electronic device 805 may generate a first public key and a first private key associated with and/or specific to the electronic device 805. The electronic device 805 may further generate a first signed key by signing the first public key with the first private key. At step S903, the electronic device 805 may transmit the first signed key to the communication device 210. At step S905, the communication device 210 may generate a second public key and a second private key associated with and/or specific to the communication device 210. The communication device 210 may further generate a second signed key by signing the second public key with the second private key. At step S907, the communication device 210 may transmit at least the first signed key, the second signed key, and account data to the authorizing entity computer 220. The account data may be included in a request for an account token to substitute sensitive data. The account data may include, for example, a user name and password, and/or may include sensitive data, such as a credential, PII, etc. The account data may further include an identifier, such as a user identifier associated with the user of the communication device 210 or a device identifier associated with the communication device 210.

In some embodiments, the first signed key and/or the second signed key may further be encrypted. In some embodiments, the first signed key and/or the second signed key may be encrypted with a public key associated with the authorizing entity computer 220. In some embodiments in which an encrypted first and/or second signed key is received from the communication device 210, the authorizing entity computer 220 may further decrypt the first and/or second signed key using its own private key to obtain the first signed key, and/or the second signed key. The public key associated with the authorizing entity computer 220 may be stored in a database of a server computer and freely distributed to any requesting entity, including the communication device 210. This may provide an additional layer of security, as only the proper corresponding private key held by the proper authorizing entity computer 220 will properly decrypt the signed key.

At step S910, the authorizing entity computer 220 may verify the account data, the first signed key, and/or the second signed key. Once verified, the authorizing entity computer 220 may transmit the first public key and the second public key to one or more nodes of a blockchain 240 at step S913. At step S915, the one or more nodes of the blockchain may generate a third public key and a third private key associated with and/or specific to the user of the communication device 210. For example, a single third public key and third private key may be associated with a user operating both the electronic device 805 and the communication device 210, while the electronic device 805 has a first public key and first private key that is unique from the second public key and the second private key of the communication device 210, At step S917, the one or more nodes of the blockchain 240 may digitally sign the first public key with the third private key to generate a first digital signature, and the second public key with the third private key to generate a second digital signature. The first digital signature and the second digital signature may be recorded to the one or more nodes of the blockchain 240. The first digital signature may be associated with the user and the electronic device 805 in that the first public key is associated with the electronic device 805 and the third private key is associated with the user. The second digital signature may be associated with the user and the communication device 210 in that the second public key is associated with the communication device 210 and the third private key is associated with the user.

At step S920, the one or more nodes of the blockchain 240 may transmit the first digital signature and the second digital signature to the authorizing entity computer 220. At step S923, the authorizing entity computer 220 may generate a first trust token using at least the first digital signature, and a second trust token using at least the second digital signature. In some embodiments, the trust tokens may include additional data, such as the first and/or second signed key received from the electronic device 805 and/or the communication device 210, a nonce, identity data (e.g., biometric data, a name, etc.), a source identifier, a destination identifier, and/or the like. This information may be obtained from the blockchain 240 or may be separately obtained by the authorizing entity computer 220. For example, the nonce may have been generated by the communication device 210 and/or the electronic device 805 and transmitted to the authorizing entity computer 220 along with its initial communication. At step S925, the authorizing entity computer 220 may transmit the first trust token and the second trust token to the communication device 210. At step S927, the communication device 210 may forward the first trust token to the electronic device 805.

At step S930, the electronic device 805 may generate and transmit a request for an account token to the communication device 210. At step S933, the communication device 210 may forward the request to the token server 230. The token server 230 may be an example of a recipient computer that receives requests for account tokens. The request may include the first trust token, as well as the sensitive data to be represented by the account token, in some embodiments. Responsive to the request, at step S935, the token server 230 may extract the first digital signature from the first trust token. At step S937, the token server 230 may transmit the first digital signature to one or more nodes of the blockchain 240. The one or more nodes of the blockchain 240 may verify the first digital signature received from the electronic device 805 against the first digital signature recorded on the blockchain 240 at step S939 and generate a verification.

In some embodiments, the one or more nodes of the blockchain 240 may compare the first digital signature sourced from the electronic device 805 to the first digital signature recorded on the blockchain 240. In some embodiments, the one or more nodes on the blockchain 240 may only compare the third private key signing the first digital signature sourced from the electronic device 805 to the third private key signing the digital signature recorded on the blockchain 240. The one or more nodes of the blockchain 240 may return the verification to the token server 230 at step S940. At step S943, the token server may authenticate the user and the electronic device 805 and generate an account token corresponding to the sensitive data. At step S945, the token server 230 may transmit the account token to the communication device 210.

At step S947, the communication device 210 may forward the account token to the electronic device 805. The electronic device 805 may be provisioned with the account token. To request additional account tokens, the electronic device 805 may provide the first trust token to the same or additional token servers 230 via the communication device 210 (or another proxy device). It may not be necessary for the electronic device 805 and/or communication device 210 to provide separate and potentially different account data for each account token to be requested. In order for the communication device 210 to request account tokens, the communication device 210 may provide the second trust token to the token server 230, and the process may proceed as described above with respect to FIGS. 2 and 3.

IV. Account Token Use Cases

Once provisioned onto a user device (e.g., a communication device and/or an electronic device), an account token may be used to perform one or more of a variety of transactions in a variety of contexts. For example, in a payment transaction, the account token may be a payment token that is provisioned onto the user device. The account token may correspond to a credential, such as a primary account number (PAN), bank account number, a credit card number, etc. The token may be transmitted through local communication (e.g., near field communication, Bluetooth, etc.) to an access device to initiate or during a payment transaction (e.g., a purchase of goods and/or services).

Figure 10:
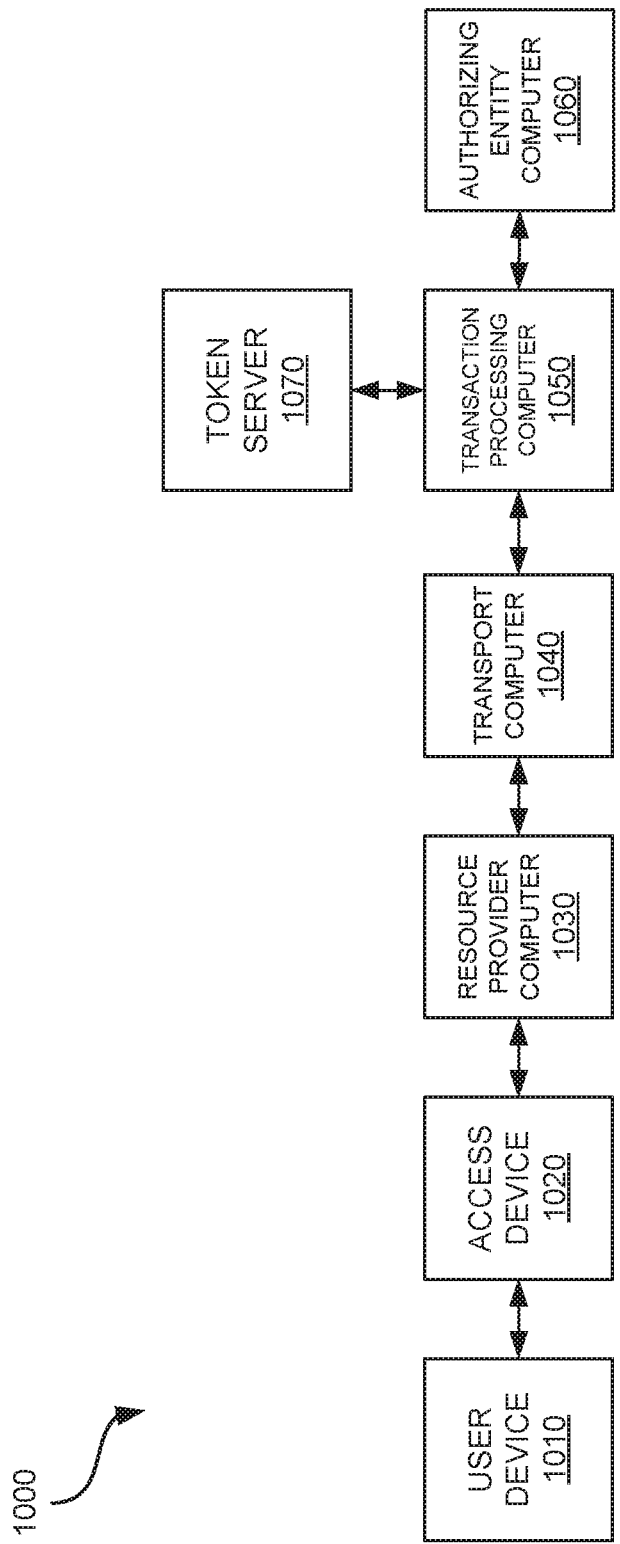
FIG. 10 shows a block diagram of a transaction processing system that can use a user device provisioned with an account token according to some embodiments of the present invention.

FIG. 10 shows a block diagram of a transaction processing system 1000 that can use a user device 1010 provisioned with an account token according to some embodiments of the present invention. The system 1000 includes a user device 1010, an access device 1020, a resource provider computer 1030, a transport computer 1040, a transaction processing computer 1050, an authorizing entity computer 1060, and a token server 1070. Each of these systems and computer may be in operative communication with each other.

For simplicity of illustration, a certain number of components are shown in FIG. 10. It is understood, however, that embodiments of the invention may include more than one of each component. In addition, some embodiments of the invention may include fewer than or greater than all of the components shown in FIG. 10. In addition, the components in FIG. 10 may communicate via any suitable communication medium (including the Internet), using any suitable communications protocol.

A user may operate the user device 1010 to select an account token to be used in a transaction. The user device 1010 may be any device suitable to carry out transactions, such as financial transactions, or any other additional related actions (any of the communication devices and/or electronic devices described herein, e.g., communication device 210 and/or electronic device 805). The user device 1010 may include a memory that may store a digital wallet application or other payment application. The application may be provisioned with an account token to enable the user device 1010 to conduct transactions (e.g., buying goods and/or services). The user device 1010 may also include a secure element that can be implemented in either hardware and/or software, which may store sensitive account or personal information, as well as the account token in some embodiments.

The account token may be used by the user device 1010 to interact with the access device 1020 in a transaction. For example, the account token may be presented by the user device 1010 to the access device 1020 to initiate a transaction. The access device 1020 may forward the token, and/or any other transaction details, to a resource provider computer 1030. The resource provider computer 1030 may be associated with a resource provider, such as a merchant, an access provider, and/or the like. The resource provider computer 1030 may generate an authorization request message for the transaction using the account token and the transaction details. The resource provider computer 1030 may comprise a server computer. The server computer may include a processor and a computer readable medium coupled to the processor, the computer readable medium comprising code, executable by the processor for performing the functionality described in further detail below.

The resource provider computer 1030 may be in communication with a transport computer 1040. The transport computer 1040 is typically a system for an entity that has a business relationship with another entity (e.g., a bank associated with a particular resource provider computer 1030). The transport computer 1040 may route an authorization request message for a transaction to the transaction processing computer 1050. The transport computer 1040 may comprise a server computer. The server computer may include a processor and a computer readable medium coupled to the processor, the computer readable medium comprising code, executable by the processor, for performing the functions described herein.

The transaction processing computer 1050 may be associated with one or more service providers. The transaction processing computer 1050 may be in communication with an entity that provides tokenization and detokenization services, such as the token server 1070. In some embodiments, the transaction processing computer 1050 may include the token server 1070. The transaction processing computer 1050 may comprise a server computer. The server computer may include a processor and a computer readable medium coupled to the processor, the computer readable medium comprising code, executable by the processor, for performing the functions described herein.

The token server 1070 may receive the account token from the transaction processing computer 1050. The token server 1070 may maintain a stored association (e.g., mapping) between the account token and the credential, such that a token exchange module is able to "translate" the account token back to the credential. In some embodiments, the account token is mathematically derived from the credential. In other embodiments, the account token is randomly generated with respect to the credential, and is simply linked to it in a data table. Regardless of how the account token is generated from the credential and vice versa, the use of an account token instead of a credential during a transaction can provide enhanced security.

Figure 2:
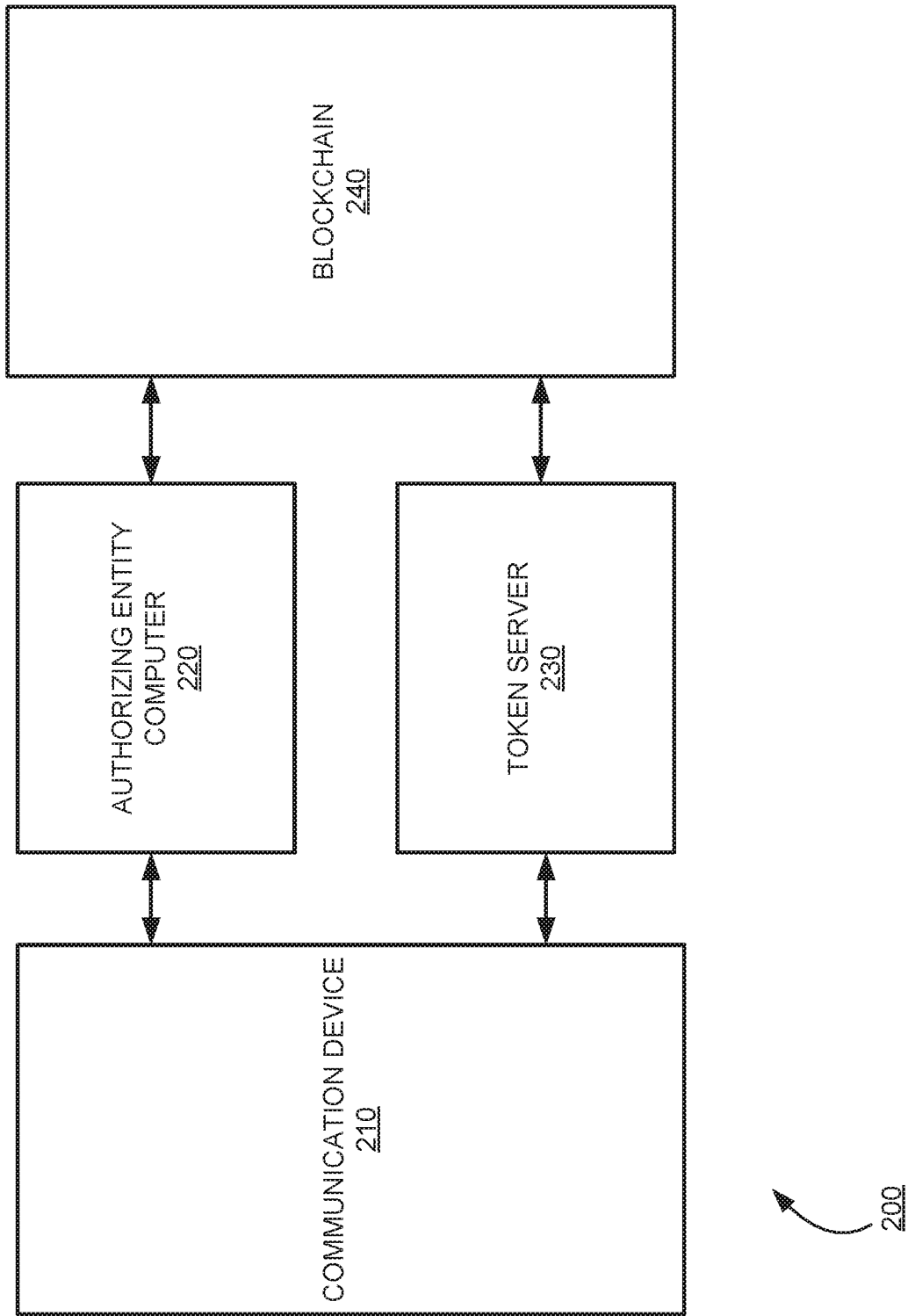
FIG. 2 shows a block diagram of an account token provisioning system implementing a trust token according to some embodiments of the present invention.

The token server may be, for example, any of the token servers described herein (e.g., token server 230 of FIG. 2). The token server 1070 may comprise a server computer. The server computer may include a processor and a computer readable medium coupled to the processor, the computer readable medium comprising code, executable by the processor for performing the functionality described in further detail below.

After translating the account token into the credential, the token server 1070 may transmit the credential back to the transaction processing computer 1050. The transaction processing computer 1050 may update the authorization request message by replacing the account token with the credential. The transaction processing computer 1050 may transmit the updated authorization request message including the credential to the authorizing entity computer 1060. The authorizing entity computer 1060 may be associated with an entity that issued the credential to the user of the user device 1010. The authorizing entity computer 1060 may be the same as or different than the authorizing entity computer 220.

The authorizing entity computer 1060 may communicate with the transaction processing computer 1050 to authorize transactions. Some systems can perform both authorizing entity computer 1060 and transport computer 1040 functions. When a transaction involves a credential (e.g., a payment account) associated with the authorizing entity computer 1060, the authorizing entity computer 1060 may verify the account and respond with an authorization response message to the transport computer 1040 via the transaction processing computer 1050, that may be forwarded to the corresponding access device 1020. The authorizing entity computer 1060 may comprise a server computer. The server computer may include a processor and a computer readable medium coupled to the processor, the computer readable medium comprising code, executable by the processor, for performing the functions described herein.

The transport computer 1040, the transaction processing computer 1050, and the authorizing entity computer 1060 are further configured to perform a clearing and settlement process at a later time after a transaction has been completed (e.g., at the end of the day).

The account tokens described herein may also be used in access transactions. For example, FIG. 11 shows a block diagram of a building access system 1100 that can use a user device 1110 provisioned with an account token according to some embodiments of the present invention. A user 1106 may operate a user device 1110 (e.g., communication device 210 and/or electronic device 805) having a provisioned account token. The account token may have been previously associated with a credential and activated by a token server (not shown). The user device 1110 may interact with the access device 1120 to transmit the account token to the access device 1115.

The access device 1115 may communicate with a remotely located server computer (not shown). The remotely located server computer may exchange the account token for the associated credential to determine whether access should be granted to building 1180, and may transmit a signal indicating this back to the access device 1120, The access device 1120 may then proceed to allow or deny access by the user 1106 to the building 1180, in accordance with the credential.

The systems and methods described herein provide a number of advantages. For example, the implementation of a trust token may allow a user device to be provisioned with multiple account tokens, without requiring multiple logins or transmissions of sensitive data. In other words, a single registration process may be used to generate a trust token, and the same trust token may thereafter be sent to different token servers associated with different entities to provision multiple account tokens associated with different credentials. In addition, the same trust token may be used for transactions of various types in some embodiments (i.e., a single trust token may be used to provision account tokens for payment and access transactions).

The use of a blockchain also provides numerous benefits. For example, the blockchain may be multi-access, allowing for decentralized and/or shared control of the blockchain. Thus, each entity may verify digital signatures for multiple related or unrelated communication devices. This allows for transparency between entities and ecosystem simplification by adding all transactions to a single blockchain. This decentralization also prevents malicious attacks as the blockchain does not have a central point of failure. In addition, the data written to the blockchain may be immutable once it is written, reducing the possibility of fraud and errors. The blockchain may also allow for faster transactions (e.g., by reducing authentication time) and lower transaction costs (e.g., by eliminating overhead costs associated with maintaining individual log-ins).

In addition, the use of an account token within the user device to conduct transactions hides the credential from resource providers, enhancing the security of transactions. For example, not only does this reduce the risk of fraud by the resource provider, but also minimizes interception and misuse of the credential by reducing the number of parties to which the credential is communicated. In addition, the mapping from the account token to the credential is limited to a token server. The token server may be highly secured and totally isolated from other transaction processing entities, further reducing the risk of fraud and interception of the credential by unauthorized parties.

Further, according to some embodiments, the account token may be provisioned or manufactured into any user device, including full functionality devices (e.g., a communication device) and limited functionality devices (e.g., an electronic device). In other words, the systems and methods described herein do not require the user device to have access to the Internet (or other remote network capabilities), and/or to have a sophisticated user interface.

A computer system may be used to implement any or all of the entities or components described above. The subsystems of the computer system may be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
receiving, by a server computer, a signed key including a first public key signed by a first private key, wherein the first public key and the first private key are generated by a communication device of a user;
transmitting, by the server computer to one or more nodes participating in a blockchain, the first public key, the server computer being different from the blockchain, wherein a node of the one or more nodes participating in the blockchain generates a second public key and a second private key specific to the user of the communication device, generates a digital signature comprising the first public key generated by the communication device signed with the second private key generated by the node participating in the blockchain, and records the digital signature on the blockchain on the one or more nodes;
receiving, by the server computer, the digital signature from the one or more nodes of the blockchain;
generating, by the server computer, a trust token that comprises the digital signature that comprises the first public key generated by the communication device as signed with the second private key generated by the node participating in the blockchain; and
transmitting, by the server computer, the trust token to the communication device.

2. The method of claim 1, wherein the communication device transmits the trust token to a recipient computer different from the server computer, and wherein the recipient computer extracts the digital signature from the trust token and transmits the digital signature to the one or more nodes participating in the blockchain, and wherein a computing node of the one or more nodes participating in the blockchain verifies, against the blockchain, the digital signature comprising the first public key generated by the communication device signed with the second private key generated by the node of the one or more nodes participating in the blockchain, and transmits a verification to the recipient computer.

3. The method of claim 2, wherein the recipient computer provisions an account token issued by the recipient computer onto the communication device after receiving the verification.

4. The method of claim 2, wherein the computing node of the one or more nodes participating in the blockchain verifies the digital signature against the blockchain by comparing the second private key signing the digital signature from the trust token against the second private key signing the digital signature from the blockchain.

5. The method of claim 1, wherein the signed key is included in the trust token.

6. The method of claim 5, wherein the signed key that includes the first public key generated by the communication device signed by the first private key generated by the communication device is encrypted.

7. The method of claim 6, wherein the signed key that includes the first public key generated by the communication device signed by the first private key generated by the communication device is encrypted with a third public key associated with the server computer.

8. The method of claim 1, wherein the trust token is further generated using a source identifier and a destination identifier.

9. The method of claim 1, wherein the server computer is associated with a federated public key infrastructure (PKI) operator.

10. The method of claim 1, wherein the communication device transmits the signed key that includes the first public key generated by the communication device signed by the first private key generated by the communication device to the server computer via an intermediary device of the user.

11. A server computer comprising:
a processor, and
a memory coupled to the processor, the memory storing instructions, which when executed by the processor, cause the server computer to perform operations including:
receiving a signed key including a first public key signed by a first private key, wherein the first public key and the first private key are generated by a communication device of a user;
transmitting the first public key to one or more nodes participating in a blockchain, wherein a node of the one or more nodes participating in the blockchain generated a second public key and a second private key specific to the user of the communication device, generates a digital signature comprising the first public key generated by the communication device signed with the second private key generated by the node participating in the blockchain, and records the digital signature on the blockchain on the one or more nodes;
receiving the digital signature from the one or more nodes of the blockchain;
generating a trust token that comprises the digital signature comprising the first public key generated by the communication device as signed with the second private key generated by the node participating in the blockchain; and
transmitting the trust token to the communication device.

12. The server computer of claim 11, wherein the communication device transmits the trust token to a recipient computer different from the server computer, and wherein the recipient computer extracts the digital signature from the trust token and transmits the digital signature to the one or more nodes participating in the blockchain, and wherein a computing node of the one or more nodes participating in the blockchain verifies, against the blockchain, the digital signature comprising the first public key generated by the communication device signed with the second private key generated by the node of the one or more nodes participating in the blockchain, and transmits a verification to the recipient computer.

13. The server computer of claim 12, wherein the recipient computer provisions an account token issued by the recipient computer onto the communication device after receiving the verification.

14. The server computer of claim 12, wherein the computing node of the one or more nodes participating in the blockchain verifies the digital signature against the blockchain by comparing the second private key signing the digital signature from the trust token against the second private key signing the digital signature from the blockchain.

15. The server computer of claim 11, wherein the signed key that includes the first public key generated by the communication device signed by the first private key generated by the communication device is included in the trust token.

16. The server computer of claim 15, wherein the signed key that includes the first public key generated by the communication device signed by the first private key generated by the communication device is encrypted.

17. The server computer of claim 16, wherein the signed key that includes the first public key generated by the communication device signed by the first private key generated by the communication device is encrypted with a third public key associated with the server computer.

18. The server computer of claim 11, wherein the trust token is further generated using a source identifier and a destination identifier.

19. The server computer of claim 11, wherein the communication device transmits the signed key that includes the first public key generated by the communication device signed by the first private key generated by the communication device to the server computer via an intermediary device of the user.

20. The method of claim 2, wherein the communication device transmits with the trust token to the recipient computer a first instance of account data, the recipient computer storing a mapping between a first token generated by the recipient computer and the first instance of account data and providing the first token in response to receiving the verification from the one or more nodes participating in the blockchain, and wherein the communication device transmits the trust token to the recipient computer with a second instance of account data that is different from the first instance of account data, the recipient computer identifying, from the mapping, that the first token was associated with the first instance of account data, the recipient computer generating and providing a second token for the second instance of account data.

* * * * *